United States Patent [19]
Kramer et al.

[11] Patent Number: 6,086,749
[45] Date of Patent: *Jul. 11, 2000

[54] CATALYST AND METHOD FOR HYDROPROCESSING A HYDROCARBON FEED STREAM IN A REACTOR CONTAINING TWO OR MORE CATALYSTS

[75] Inventors: David C. Kramer, San Anselmo; Bruce E. Stangeland, Berkeley, both of Calif.

[73] Assignee: Chevron U.S.A. Inc., San Francisco, Calif.

[*] Notice: This patent is subject to a terminal disclaimer.

[21] Appl. No.: 08/994,339

[22] Filed: Dec. 19, 1997

Related U.S. Application Data

[60] Provisional application No. 60/034,439, Dec. 23, 1996.

[51] Int. Cl.[7] .......................... C10G 47/04; C10G 47/02; C10G 45/04
[52] U.S. Cl. .......................... 208/213; 208/108; 208/112; 208/110; 208/216 R; 208/217; 208/251 H; 208/254 H
[58] Field of Search ..................................... 208/108, 112, 208/110, 213, 216 R, 217, 251 H, 254 H

[56] References Cited

U.S. PATENT DOCUMENTS

| | | | |
|---|---|---|---|
| 3,336,217 | 8/1967 | Meaux | 208/143 |
| 3,470,900 | 10/1969 | Rothauser | 137/247.51 |
| 3,716,478 | 2/1973 | Kodera et al. | 208/152 |
| 3,730,880 | 5/1973 | Van der Toorn et al. | 208/213 |
| 3,880,569 | 4/1975 | Bannister et al. | 431/4 |
| 4,167,474 | 9/1979 | Sikonia | 208/140 |
| 4,259,294 | 3/1981 | Van Zijll Langhout et al. | 422/190 |
| 4,312,741 | 1/1982 | Jacquin | 208/11 LE |
| 4,392,943 | 7/1983 | Euzen et al. | 208/152 |
| 4,444,653 | 4/1984 | Euzen et al. | 208/152 |
| 4,571,326 | 2/1986 | Bischoff et al. | 422/207 |
| 4,639,354 | 1/1987 | Bischoff et al. | 422/140 |
| 5,076,908 | 12/1991 | Stangeland et al. | 208/148 |
| 5,593,570 | 1/1997 | Habib et al. | 208/108 |
| 5,733,440 | 3/1998 | Stangeland et al. | 208/148 |

*Primary Examiner*—Walter D. Griffin
*Assistant Examiner*—Tam M. Nguyen
*Attorney, Agent, or Firm*—A. Stephen Zavell; W. Keith Turner

[57] ABSTRACT

A method and catalyst mixture for hydroprocessing a hydrocarbon feed stream through a moving catalyst bed having a catalyst mixture and contained within a single onstream reactor vessel. The reactor vessel contains the catalyst mixture which includes two or more different and distinct catalyst for any hydroprocessing application. The different and distinct catalyst have different catalyst density and are designed for a different function, such as HDM and HDN. The different and distinct catalysts can also have different average residence times if their densities and physical properties are properly selected.

30 Claims, 12 Drawing Sheets

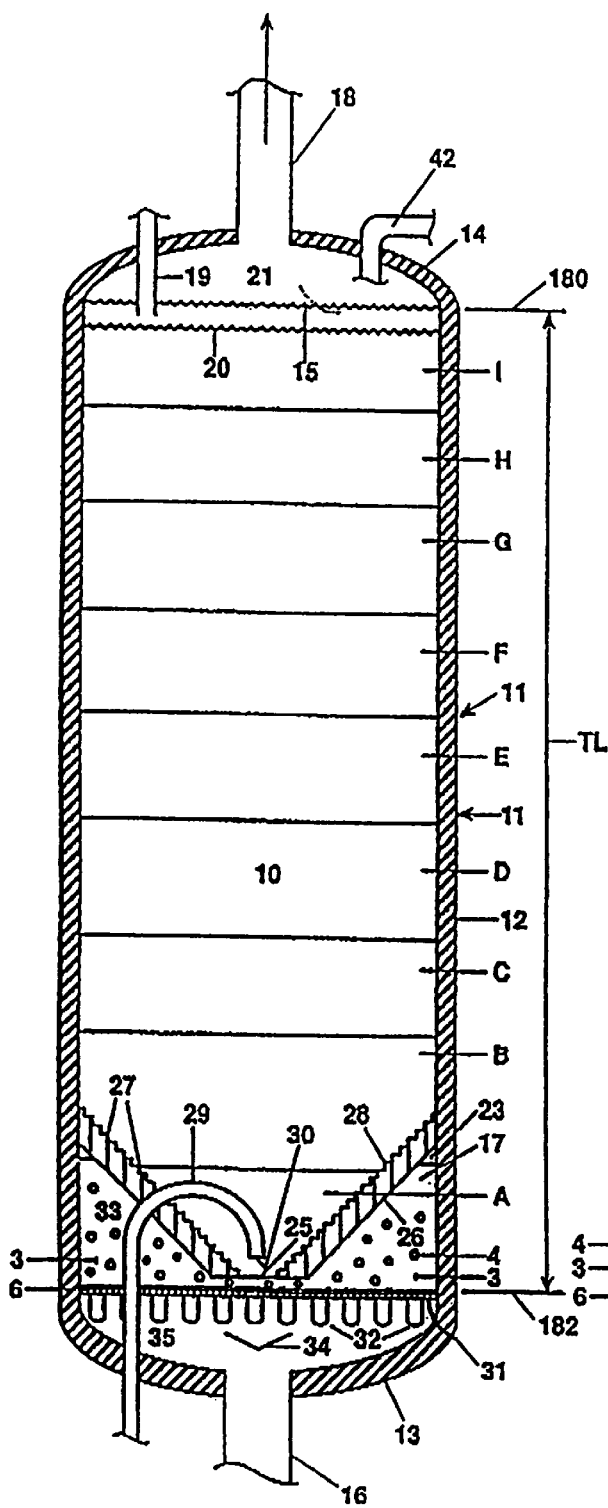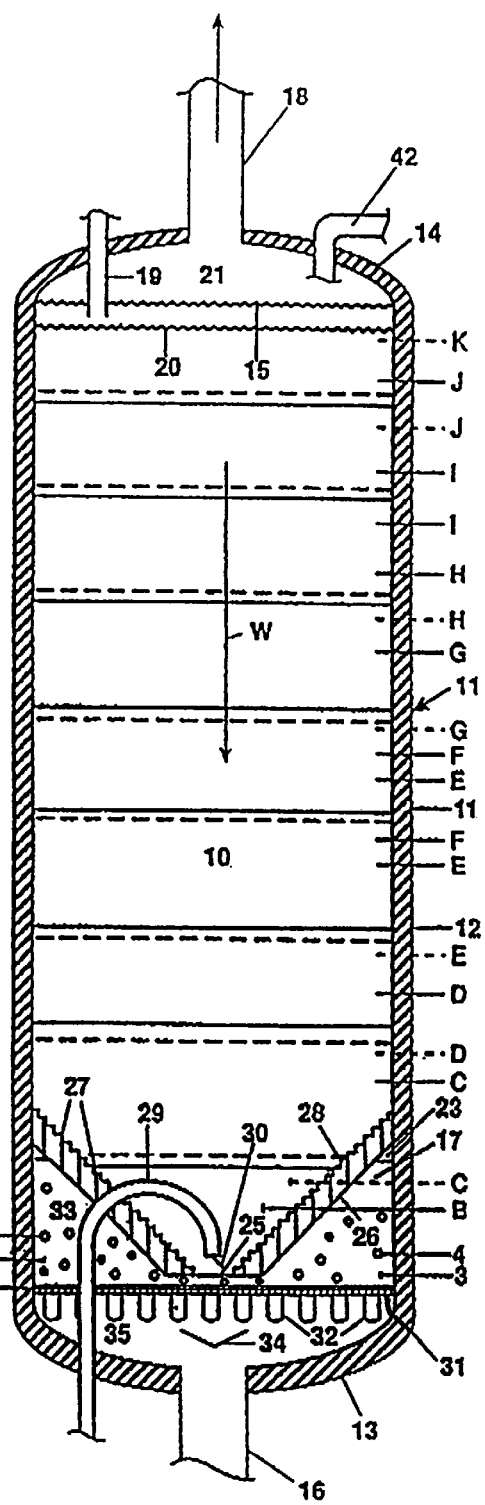

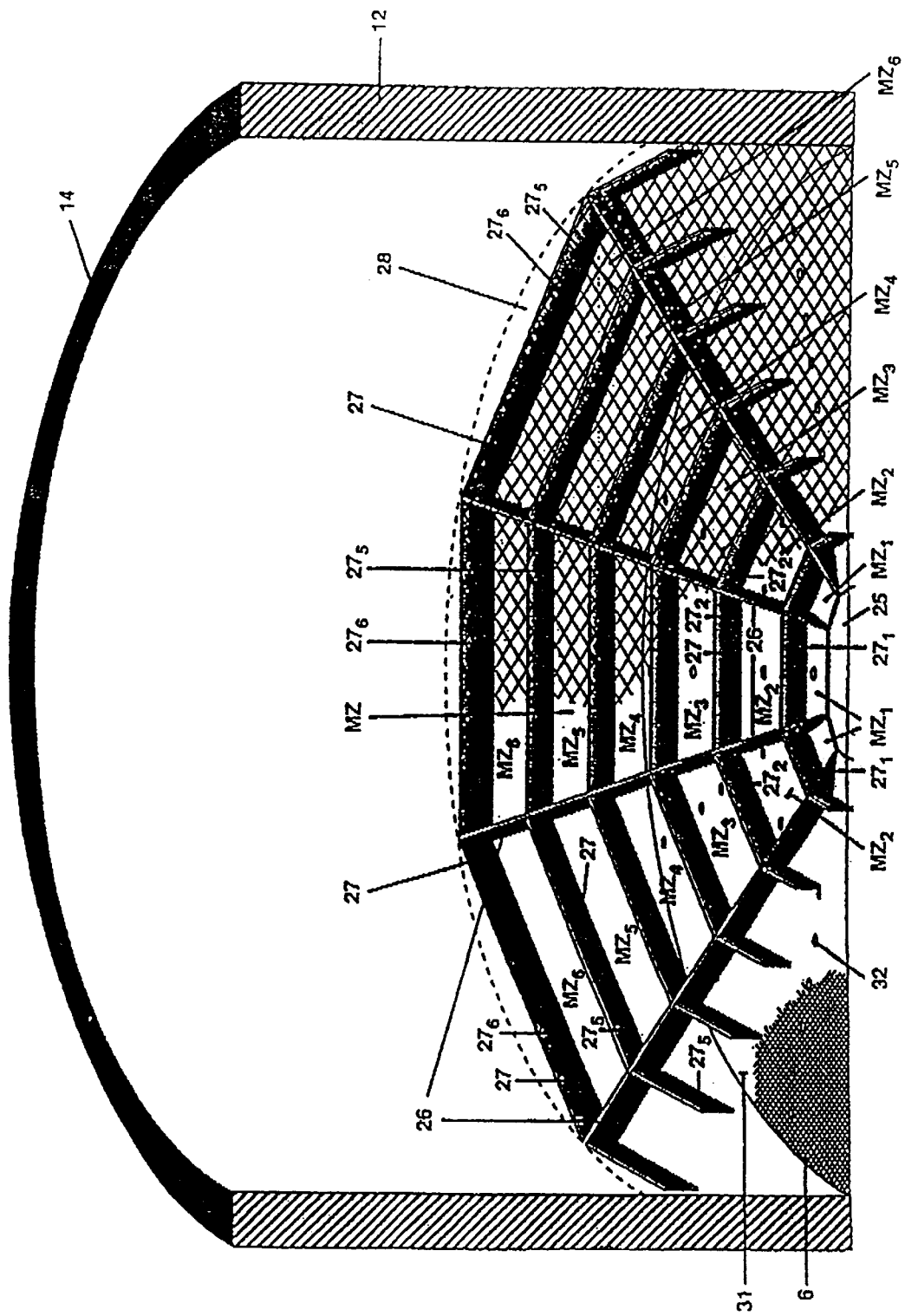

CATALYST AND METHOD FOR HYDROPROCESSING A HYDROCARBON FEED STREAM IN A REACTOR CONTAINING TWO OR MORE CATALYSTS

This application claims the benefit of provisional application Ser. No. 60/034,439, filed Dec. 23, 1996.

BACKGROUND OF THE INVENTION

1. Field of the Invention

The present invention broadly relates to a catalyst mixture and to a method of hydroprocessing a hydrocarbon feed stream in a moving bed hydroprocessing reactor containing two or more catalysts, each designed for a different function.

More particularly, the present invention relates to an on stream catalyst replacement (OCR) reactor containing two or more catalysts, each designed for a different function (e.g. HDM and HDN) and having a different size and density so that one type of catalyst may be removed from the OCR reactor faster than the other type of catalyst. The present invention provides a method for hydroprocessing with a mixture of two or more different (i.e. different in physical and/or catalytic properties) and distinct catalysts, all employed in a single onstream reactor for any hydroprocessing application; and where at least partially spent catalyst particles are withdrawn from the single on stream reactor and fresh catalyst consisting of at least one of the two or more different and distinct catalyst is added while the single onstream reactor is hydroprocessing a hydrocarbon feed stream.

2. Description of the Prior Art

Hydroprocessing or hydrotreatment to remove undesirable components from hydrocarbon feed streams is a well known method of catalytically treating such heavy hydrocarbons to increase their commercial value. "Heavy" hydrocarbon liquid streams, and particularly reduced crude oils, petroleum residua, tar sand bitumen, shale oil or liquefied coal or reclaimed oil, generally contain product contaminants, such as sulfur, and/or nitrogen, metals and organo-metallic compounds which tend to deactivate catalyst particles during contact by the feed stream and hydrogen under hydroprocessing conditions. Such hydroprocessing conditions are normally in the range of 212 degree(s) F to 1200 degree(s) F (100 degree(s) to 650 degree(s) C.) at pressures of from 20 to 300 atmospheres. Generally such hydroprocessing is in the presence of catalyst containing group VI or VIII metals such as platinum, molybdenum, tungsten, nickel, cobalt, etc., in combination with various other metallic element particles of alumina, silica, magnesia and so forth having a high surface to volume ratio. More specifically, catalyst utilized for hydrodemetallation, hydrodesulfurization, hydrodenitrification, hydrocracking etc., of heavy oils and the like are generally made up of a carrier or base material; such as alumina, silica, silica-alumina, or possibly, crystalline aluminosilicate, with one or more promoter(s) or catalytically active metal(s) (or compound(s)) plus trace materials. Typical catalytically active metals utilized are cobalt, molybdenum, nickel and tungsten; however, other metals or compounds could be selected dependent on the application.

Because these reactions must be carried out by contact of a hydrogen-containing gas with the hydrocarbon feed stream at elevated temperatures and pressures, the major costs of such processing are essentially investment in vessels and associated furnaces, heat exchangers, pumps, piping and valves capable of such service and the replacement cost of catalyst contaminated in such service. Commercial hydroprocessing of relatively low cost feed stocks such as reduced crude oils containing pollutant compounds, requires a flow rate on the order of a few thousand up to one hundred thousand barrels per day, with concurrent flow of hydrogen at up to 10,000 standard cubic feet per barrel of the liquid feed. Vessels capable of containing such a reaction process are accordingly cost-intensive both due to the need to contain and withstand corrosion and metal embrittlement by the hydrogen and sulfur compounds, while carrying out the desired reactions, such as demetallation, denitrification, desulfurization, and cracking at elevated pressure and temperatures. Pumps, piping and valves for handling fluid streams containing hydrogen at such pressures and temperatures are also costly, because at such pressures seals must remain hydrogen impervious over extended service periods of many months. It is also cost-intensive to insure that all additional reactor vessels (e.g. fixed bed reactors, etc.) are obtained in order to catalytically process hydrocarbon feed streams from an initial reactor vessel where certain catalytic hydroprocessing (e.g. hydrodemetallation) is/are to be performed to one or more other reactor vessel(s) where additional catalytic hydroprocessing (e.g. hydrodenitrification) is/are to be performed.

Further, hydroprocessing catalyst for such one or more reactor vessel(s), which typically contains catalytically active metals such as titanium, cobalt, nickel, tungsten, molybdenum, etc., may involve a catalyst inventory of 500,000 pounds or more at a cost of $2 to $4/lb. Accordingly, for economic feasibility in commercial operations, the process must handle high flow rates and the one or more reactor vessel(s) should be filled with as much catalyst inventory as possible to maximize catalyst activity and run length. Additionally, the down-time for replacement or renewal of catalyst must be as short as possible. Further, the economics of the process will generally depend upon the versatility of the system to handle feed streams of varying amounts of contaminants such as sulfur, nitrogen, metals and/or organic-metallic compounds, such as those found in a wide variety of the more plentiful (and hence cheaper) reduced crude oils, residua, or liquefied coal, tar sand bitumen or shale oils, as well as used oils, and the like.

It is known to use a series of individual reactor vessels stacked one above the other, with fluid flow either co-current or counterflow to catalyst. In such a process, catalyst moves by gravity from the upper vessel to a lower vessel by periodically shutting off, or closing, valves between the individual vessels. In a counterflow system, this permits removal of catalyst from the lowermost or first stage vessel, where the most contaminated, or raw, feed stock, originally contacts the catalyst. In this way, most of the major contaminating components in the hydrocarbon stream are removed before the hydrocarbon material reaches major conversion steps of the process performed in higher vessels of the stacked series. Thus, most of the deactivating components of the feed stream are removed before it reaches the least contaminated catalyst added to the topmost vessel. However, such systems require valves suitable for closing off catalyst flow against catalyst trapped in the line. Hence, valve life is relatively short and down-time for replacement or repair of the valves is relatively costly. Also, such series of individual reactor vessels are costly since each respective reactor vessel must be purchased separately.

As particularly described in U.S. Pat. No. 5,076,908 to Stangeland et al, a substantially packed-bed type reactor system is an upflow type reactor system including multiple reaction zones of packed catalyst particles having little or no movement during normal operating conditions of no catalyst addition or withdrawal. In the substantially packed-bed type reactor system of Stangeland et al., when catalyst is withdrawn from the reactor during normal catalyst replacement, the catalyst flows in a downwardly direction under essentially plug flow or in an essentially plug flow fashion, with a minimum of mixing with catalyst in layers which are adjacent either above or below the catalyst layer under observation.

As particularly distinguished from prior known methods of on-stream catalyst replacement in hydroprocessing, the method and apparatus in U.S. Pat. No. 5,076,908 to Stangeland et al more specifically provides a system wherein plug flow of the catalyst bed is maintained over a wide range of counterflow rates of a hydrocarbon feed stream and hydrogen gas throughout the volume of the substantially packed catalyst bed. Such packed catalyst bed flow maintains substantially maximum volume and density of catalyst within a given reactor vessel's design volume by controlling the size, shape and density of the catalyst so that the bed is not substantially expanded at the design rate of fluid flow therethrough. The proper size, shape and density are determined by applying coefficients gained during extensive studying of bed expansion with hydrocarbon, hydrogen and catalyst at the design pressures and flow velocities as particularly described below. However, Stangeland et al does not teach or suggest a method and/or a reactor for hydroprocessing a hydrocarbon feed stream through a single onstream reactor having a mixture of two or more different (i.e. different in physical and/or catalytic properties) and distinct catalysts.

The prior art does not disclose or suggest a mixture of two or more different and distinct catalysts in a single onstream reactor; nor does the prior art disclose or suggest the above enumerated and pertinent features of either the total system or significant portions of such a system in U.S. Pat. No. 5,076,908 to Stangeland et al, as disclosed by the following patents:

Jacquin et al. U.S. Pat. No. 4,312,741, is directed toward a method of on-stream catalyst replacement in a hydroprocessing system by controlling the feed of hydrogen gas at one or more levels. Catalyst, as an ebullated bed counterflows through the reactor but is slowed at each of several levels by horizontally constricted areas which increase the hydrogen and hydrocarbon flow rates to sufficiently locally slow downward flow of catalyst. While local recycling thus occurs at each such stage, rapid through-flow of fresh catalyst, with resultant mixing with deactivated or contaminated catalyst, is suppressed. The ebullating bed aids simple gravity withdrawal of catalyst from the vessel. Improvement of the disclosed system over multiple vessels with valves between stages is suggested to avoid the risk of rapid wear and deterioration of valve seals by catalyst abrasion.

Kodera et al. U.S. Pat. No. 3,716,478, discloses low linear velocity of a mixed feed of liquid and $H_2$ gas to avoid expansion (or contraction) of catalyst bed. By low linear velocity of fluid upflow, gas bubbles are controlled by flow through the packed bed, but the bed is fluidized by forming the bottom with a small cross-sectional area adjacent the withdrawal tube. This assists discharge of catalyst without backmixing of contaminated catalyst with fresh catalyst at the top of the single vessel. The range of the bed level in the vessel is from 0.9 to 1.1 of the allowable bed volume ("10%) due to fluid flow through the bed. A particular limitation of the system is that flow of the fluids undergoing catalytic reaction is restricted to a rate that will not exceed such limits, but must be adequate to ebullate the bed adjacent the catalyst withdrawal tube. Alternatively, injection of auxiliary fluid from a slidable pipe section is required. The patentees particularly specify that the diameter of the lower end of the vessel is smaller to increase turbulence and ebullation of catalyst adjacent the inlet to the catalyst withdrawal line. Fluidization of catalyst is accordingly indicated to be essential to the process. However the disclosed gas flow rates are well below commercial flow rates and there is no suggestion of temperatures or pressures used in the tests or the size, density or shape of the catalyst.

Bischoff et al, U.S. Pat. No. 4,571,326, is directed to apparatus for withdrawing catalyst through the center of a catalyst bed counterflowing to a liquid hydrocarbon and gas feed stream. The system is particularly directed to arrangements for assuring uniform distribution of hydrogen gas with the liquid feed across the cross-sectional area of the bed. Such uniform distribution appears to be created because the bed is ebullating under the disclosed conditions of flow. Accordingly, considerable reactor space is used to initially mix the gas and hydrocarbon liquid feeds in the lower end of the vessel before flowing to other bottom feed distributors. The feeds are further mixed at a higher level by such distributor means in the form of "Sulzer Plates" or a "honeycomb" of hexagonal tubes beneath a truncated, conical, or pyramidal-shaped funnel screen. The arrangement may include an open ramp area parallel to the underside of the screen between the tube or plate ends. Further, to maintain gas distribution along the length of the catalyst bed, quench gas is supplied through upflowing jets in star-shaped or annular headers extending across middle portions of the vessel. The arrangement for withdrawal of spent catalyst requires ebullation of at least the lower portion of the bed. As noted above, added vessel space for uniform mixing of hydrogen and feed before introducing the fluids into an ebullated bed, as well as an ebullating bed, increases the required size of the hydroprocessing vessel, increases catalyst attrition, increases catalyst bed mixing and substantially increases initial, and continuing operating costs of the system.

Bischoff et al. U.S. Pat. No. 4,639,354, more fully describes a method of hydroprocessing, similar to U.S. Pat. No. 4,571,326, wherein similar apparatus obtains uniform ebullation through the vertical height of a catalyst bed, including a quench gas step.

Meaux U.S. Pat. No. 3,336,217, is particularly directed to a catalyst withdrawal method from an ebullating bed reactor. In the system, catalyst accumulating at the bottom of a vessel and supported on a flat bubble-tray may be withdrawn through an inverted J-tube having a particular ratio of the volume of the short leg of the J-tube to the longer leg. The diameter of the J-tube is suited only to flow of catalyst from a body of catalyst ebullated by the upflowing hydrocarbon feed and gas.

U.S. Pat. Nos. 4,444,653 and 4,392,943, both to Euzen, et al., disclose removal systems for catalyst replacement in an ebullating bed. In these patents, the fluid charge including hydrocarbon containing gas is introduced by various arrangements of downwardly directed jets acting laterally against or directly onto the conical upper surface of the bed support screen or screens. Alternatively, the feed is introduced through a conical screen after passing through a distributor arrangement of tortuous paths or a multiplicity of separate tubes to mix the gas and liquid feed over the conical screen. Such arrangements use a considerable volume of the pressure vessel to assure such mixing.

U.S. Pat. Nos. 3,730,880 and 3,880,569, both to Van der Toorn, et al., disclose a series of catalytic reactors wherein catalyst moves downwardly by gravity from vessel to vessel through check valves. As noted above, such valves require opening and closing to regulate the rate of flow, or to start and stop catalyst transfer, with catalyst in the valve flow path. Feed of process fluids is either co-current or counter-current through the catalyst bed.

Van ZijllLanghaut et al. U.S. Pat. No. 4,259,294, is directed to a system for on-stream catalyst replacement by entrainment of the catalyst in oil pumped as a slurry either to withdraw catalyst from or to supply fresh catalyst to, a reactor vessel. Reacting feed is suggested to be either co-current or countercurrent with catalyst flow through the reactor. Valves capable of closing with catalyst in the line, or after back-flow of slurry oil, are required to seal off the catalyst containing vessel at operating temperatures and pressures from the receiving reactor vessel, or isolate the catalyst receiving lock hopper from the withdrawal section of the vessel.

Carson U.S. Pat. No. 3,470,900, and Sikama U.S. Pat. No. 4,167,474, respectively illustrate multiple single bed reactors and multi-bed reactors in which catalyst is replaced either continuously or periodically. The feed and catalyst flow co-currently and/or radially. Catalyst is regenerated and returned to the reactor, or disposed of No catalyst withdrawal system is disclosed apart from either the configuration of the internal bed support or the shape of the vessel bottom to assist gravity discharge of catalyst.

One of the basic principles and teachings of Stangeland et al in U.S. Pat. No. 5,076,908, is that by specifically selecting the size, shape, and density of the catalyst pellets, combined with appropriate control of process liquid and gas velocities, random motion and backmixing of the catalyst can be minimized, and plugflow characteristics of the catalyst downward and the liquid and gas flows upward, maximized. Stangeland et al economically utilizes space within a hydroprocessing vessel over a wide range of processing rates without substantial random motion or ebullation of a packed bed of catalyst during high counterflow rates of the hydrocarbon feed and a hydrogen containing gas through the packed bed, while maintaining continuous or intermittent replacement of catalyst for plug-like flow of the bed through the vessel. Such plug flow with high processing rates is obtained by Stangeland et al by selecting the size, shape and density of the catalyst particles to prevent ebullation and bed expansion at the design flow rate so as to maximize the amount of catalyst in the vessel during normal operation and during catalyst transfer. Catalysts are selected utilizing data gained while studying catalyst bed expansion, such as in a large pilot plant run, with hydrocarbon, hydrogen and catalyst at the design pressures and flow velocities within the available reaction volume of the vessel. Catalyst is removed from the bed by Stangeland et al through laminar flow of the catalyst particles in a liquid slurry system in which the liquid flow line is uniform in diameter, and substantially larger than the catalyst particles, throughout the flow path between the reactor vessel and a pressurizable vessel including passageways through the flow control valves.

However, the method and reactor disclosed by Stangeland et al in U.S. Pat. No. 5,076,908, as well as the method(s) and reactor(s) taught by the above-identified prior art patents relating to U.S. Pat. No. 5,076,908 to Stangeland et al, all suggest that additional reactor vessels are needed to further process hydrocarbon products produced by a reactor vessel containing a single catalyst bed. The reactor vessel(s) of the prior art allow the employment of one catalyst bed in a single reactor. If two or more catalyst beds are needed and they are not to be mixed together, then two or more separate moving-bed reactors placed in series are required. Separate reactors for separate purposes are expensive. Therefore, what is needed and what has been invented is a method and a reactor that is capable of containing a mixture of two or more distinct catalysts wherein each of the two or more distinct catalysts has a different catalytic purpose (e.g. one catalyst would be for hydrodemetallation; a second catalyst would be for hydrodenitrification; a third catalyst would be for hydrodesulfurization; etc.).

SUMMARY OF THE INVENTION

The present invention accomplishes its desired objects by broadly providing a method for hydroprocessing a hydrocarbon feed stream that is upflowing through a hydroconversion reaction zone comprising the steps of: disposing a plurality of first catalyst particles in a hydroconversion reaction zone, with each of the first catalyst particles having a first catalyst base and a first catalyst density; upflowing into the plurality of first catalyst particles a hydrocarbon feed stream having a liquid component and a hydrogen-containing gas component; disposing a plurality of second catalyst particles in the hydroconversion reaction zone, with each of the second catalyst particles comprising a second catalyst base and a second catalyst density to produce a catalytic mixture which includes the first catalyst particles and the second catalyst particles; continuing upflowing into the catalytic mixture the hydrocarbon feed stream; withdrawing a volume of at least partially spent catalyst from the hydroconversion reaction zone; and adding fresh catalyst into the hydroconversion reaction zone at a volume to substantially replace the volume of the at least partially spent catalyst.

The present invention further accomplishes its desired objects by broadly providing a method for hydroprocessing a hydrocarbon feed stream that is upflowing through a hydroconversion reaction zone comprising the steps of: disposing a catalyst mixture into a hydroconversion reaction zone wherein the catalyst mixture comprises a plurality of first catalyst particles and a plurality of second catalyst particles, with each of the first catalyst particles comprising a first catalyst base and a first catalyst density and with each of the second catalyst particles comprising a second catalyst base and a second catalyst density; upflowing into the catalyst mixture a hydrocarbon feed stream having a liquid component and a hydrogen-containing gas component; withdrawing a volume of at least partially spent catalyst from the hydroconversion reaction zone; and adding fresh catalyst into the hydroconversion reaction zone at a volume to substantially replace the withdrawn volume of the at least partially spent catalyst.

The first catalyst particles and the second catalyst particles differ from each other. More particularly, they have a different densities and/or different catalyst base. They also have different physical and/or catalytic properties. The desired residence time for each catalyst in the hydroconversion reaction zone of the reactor is different. For example, high activity denitrification catalysts (e.g. the first catalyst particles) foul quickly and are to be replaced often; whereas demetalation catalyst (e.g. the second catalyst particles) remain active and useful for a much longer time and it would therefore more cost effective to leave them in the reactor longer and allow them to accumulate the maximum amount of metals as possible before withdrawal. As the respective catalyst particles are withdrawn, fresh respective catalyst particles are added. The changing-out of different types of catalysts at different rates in accordance with the present invention offers an advantage over conventional fixed-bed processes and other single, moving-bed processes.

In a preferred embodiment of the invention, at least one of the two or more different types of catalyst comprises a plurality of catalytic particulates having a mean diameter ranging from about 35 Tyler mesh to about 3 Tyler mesh; and a size distribution such that at least about 90% by weight of the catalytic particulates have an aspect ratio less than about 2.0 and a diameter ranging from $R_1$ to about $R_2$, wherein: $R_1$ has a value ranging from about 1/64 inch to about 1/4 inch, $R_2$ has a value ranging from about 1/64 inch to about 1/4 inch, and a value of a ratio $R_2/R_1$ ranges from about 1.0 to about 1.4. The one or more other types of catalyst may be of any different size and/or shape and/or density. The mixture of catalyst may be employed in any hydrogenation process. Preferably, the catalyst mixture is for producing a plug-flowing substantially packed bed of hydroprocessing catalyst during hydroprocessing by contacting a substantially packed bed of hydroprocessing catalyst with an upflowing hydrocarbon feed stream. More particularly, when the catalytic particulates are disposed in a hydrocarbon reaction zone, a substantially packed bed of hydroprocessing catalyst is produced; and when a hydrocarbon feed stream flows upwardly through the substantially packed bed of hydroprocessing catalyst, plug-flowing commences when a volume of the catalytic particulates is withdrawn from a bottom of the hydrocarbon reaction zone. As used herein "catalyst" includes other particles which interact with a feed stream, such assorbents, or other fluid contact bodies. The catalyst is disposed in a reaction zone and a hydrocarbon feed stream is flowed upwardly through the catalyst for hydroprocessing the hydrocarbon feed stream. At least one of the two or more different types of the catalytic particulates have a size distribution such that a maximum of about 2.0% by weight of said catalytic particulates have a diameter less than $R_1$. The at least one of the two or more different types of catalytic particulates also have a size distribution such that a maximum of about 0.4% by weight of the catalytic particulates have a diameter less than $R_3$, wherein $R_3$ is less than $R_1$ and the value of the ratio $R_1/R_3$ is about 1.4. The catalytic particulates also have a maximum attrition of about 1.0% by weight of the catalytic particulates through a diameter having a value of $R_1$; and the catalytic particulates also have a maximum attrition of about 0.4% by weight of the catalytic particulates through a diameter having a value of $R_3$, wherein $R_3$ is less than $R_1$ and the 2 value of the ratio $R_1/R_3$ is about 1.4.

From the foregoing summary it will be apparent that several significant factors contribute directly to the present invention accomplishing its desired objects, and to the efficient use of a given process reactor vessel to assure non-ebullating, plug-like flow of a body of catalyst particles therethrough while being contacted by a counter-flowing hydrocarbon fluid stream of gas and liquid at maximum space-velocity. Among such significant factors are: (i) the size, volume and density characteristics of such catalyst particles at preselectable flow velocities and pressures of the hydrocarbon fluid stream; (ii) control of catalyst bed ebullation and/or levitation during hydrocarbon fluid and hydrogen flows; (iii) laminar flow of the catalyst particles during movement into and out of the catalyst moving bed for replacement (or regeneration or rejuvenation) without bed ebullation or levitation; (iv) and for a preferred catalyst support means, concentric annular feed of alternate rings of the gas and liquid components of the hydrocarbon feed uniformly into the full moving catalyst bed, which is capable of recovering promptly from upset or pressure changes in the reactor vessel to restore such alternate rings of gas and liquid over process runs of extended length (e.g. several thousand hours); and (v) redistribution of the gas components along the axial length of the moving bed. Therefore, if two or more catalyst of different densities (and optionally of essentially the same size) are loaded into a moving-bed reactor (especially upflow), the lighter catalyst will tend to stay near the top of the reactor, if the catalyst bed is essentially a settled or fixed bed or even if the catalyst bed is expanded to about 10%. As the lighter catalyst picks-up and accumulates coke and metals, however, the density will eventually increase enough that it will sink to the bottom of the reactor where it is withdrawn. The lighter catalyst will therefore stay in the reactor vessel over a longer period of time to maximize its working-life and usefulness, without premature withdrawal from the reactor vessel where there would still be usefulness and activity in the lighter catalyst. The residence time is controlled by controlling the initial density difference between the two (or more) catalyst, and knowing how rapidly the density increases over time.

It is therefore an object of the present invention to provide a catalyst mixture containing two or more different and distinct catalyst having different catalyst density and designed for a different function, such as HDM and HDN.

It is another object of the present invention to broadly provide a method for hydroprocessing a hydrocarbon feed stream through a mixture of two or more hydroprocessing catalyst within a hydroconversion reaction zone within a single onstream reactor.

These, together with the various ancillary objects and features which will become apparent to those skilled in the art as the following description proceeds, are attained by this invention, a preferred embodiment as shown with reference to the accompanying drawings, by way of example only, wherein:

BRIEF DESCRIPTION OF THE DRAWINGS

FIG. 8 is a partial cross-sectional view illustrating a catalytic bed with a plurality of superimposed layers with respect to each other before commencement of a plug-flow;

FIG. 9 is a partial cross-sectional view illustrating a catalytic bed which is moving downwardly in a plug-flow fashion;

FIG. 10 is a partial cross-sectional view of the reactor and a partial perspective view of another embodiment of the catalytic support means;

DETAILED DESCRIPTION OF THE INVENTION INCLUDING PREFERRED EMBODIMENTS OF THE INVENTION

Figure 1:
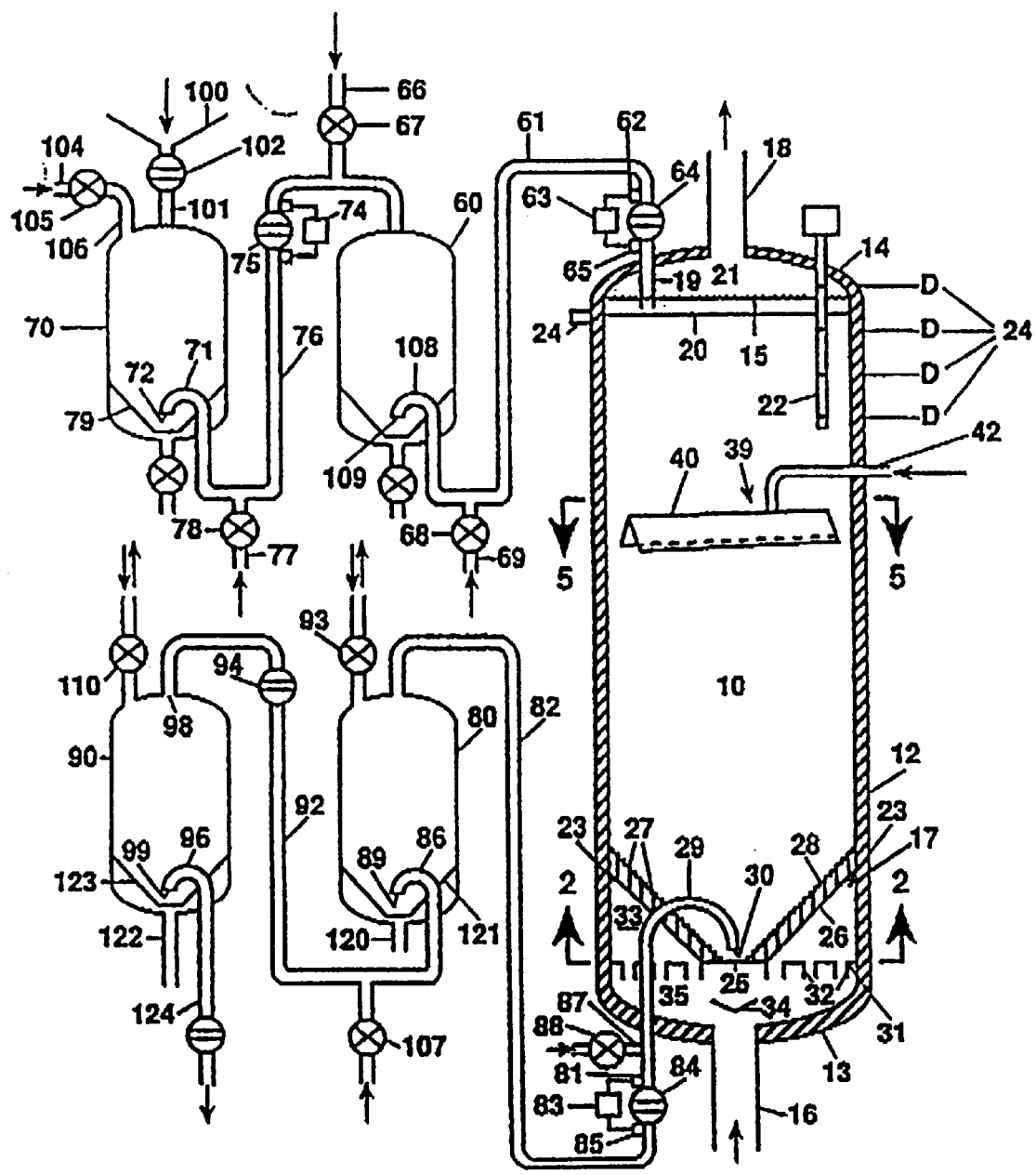
FIG. 1 is a schematic view of a typical hydroprocessing vessel to which the present invention is particularly directed for on-stream catalyst replacement during continuous plug-like flow of catalyst through up-flowing liquid hydrocarbon feed and gas streams.

Referring in detail now to the drawings, and initially more particularly to FIG. 1, a hydroprocessing system is shown embodying the method of the present invention to increase substantially both the continued catalytic activity of a single volume or single bed of catalyst 10 and the efficient use of a single reactor vessel of a given reactor volume, such as reactor vessel 11. Vessel 11, as indicated by the thickness of its cylindrical side wall 12 and domed closure heads, or ends, 13 and 14, is designed to react a hydrogen containing gas mixed with a liquid hydrocarbon stream at a pressure of up to about 300 atmospheres (about 4500 lbs per square inch) and up to about 650E C. (about 1200E F.). Such reaction gas and a feed stream of hydrocarbon liquids are preferably premixed and introduced as a single stream through bottom head 13 by line 16.

To assure maximum catalytic benefit during the hydroprocessing of the hydrocarbon feed stream and the hydrogen-containing gas, it is essential that vessel 11 contain as much catalyst as possible within the design volume of vessel 11. Accordingly as indicated, support means 17 for catalyst bed 10 is placed as low as possible in vessel 11 while assuring full and adequate dispersion of the hydrogen phase within the liquid hydrocarbon stream. At the same time, the upper limit of bed 10 is near the top of domed head 14, while providing an adequate space 21 for disengaging any entrained catalyst from the resulting products withdrawn through center pipe 18. To insure that catalyst is not entrained into product fluids exiting through center pipe 18, a screen 15 may be installed in space 21 above a bed surface 20 defining the top of the catalyst bed 10. Fresh catalyst is then added to bed surface 20 through pipe 19 extending through screen 15. Desirably, the upper level or top of the catalyst bed 10, designated as the bed surface 20, is preferably controlled on a continuous basis by gamma ray absorption measurement made possible by a gamma ray source 22 and gamma ray detector 24 positioned in close proximity to the bed surface 20 of catalyst bed 10. Such a gamma ray source may be in the form of radioactive isotopes, such as Cesium 137, disposed inside the reactor in a specially designed well. Alternatively the source can be an electrically controllable source, such as a thermal neutron activated gamma ray generator. Detector 24 may be in the form of an ionization tube, Geiger-Mueller tube or a scintillation detector. Suitable sources and detectors are manufactured by Ronan Engineering Co., Texas Nuclear and other vendors. By detecting the level of surface 20, it is possible, in accordance with the invention, to insure that the catalyst inventory is maintained at the optimum level and that the reactor is never overfilled.

Overfilling the reactor increases the chance that catalyst particles will be crushed in the isolation valves in the transfer lines when they are closed, at the end of each transfer. Bed level control is also needed to confirm that ebullation of the bed is minimized and that undesirable excursions from the design flow rate for hydrogen and hydrocarbon feed flowing upwardly through bed 10 are avoided for the selected catalyst. To this end, the size, shape, and density of catalyst particles supplied to the bed are selected in accordance with the designed maximum rate of flow of the feed streams to prevent such ebullation. Such control assures that bed 10 progressively moves down through vessel 11 in layers as by a plug flow. A "plug flow" of the catalyst bed 10 is illustrated in FIGS. 8 and 9 and may be best described as when a lowermost volumetric layer A is removed, the next volumetric layer B flows downwardly to replace the lowermost volumetric layer B and assumes a new position as a lowermost volumetric layer B. The removed lowermost volumetric layer A is replaced with an upper volumetric layer J. The procedure is again repeated (as best shown by the dotted line representations in FIG. 9) by removing the lowermost volumetric layer B and causing the next volumetric layer C to flow downwardly in a plug-like fashion to replace the lowermost volumetric layer B and assume a new position as a lowermost volumetric layer C.

The removed lowermost volumetric layer B is replaced with an upper volumetric layer K. The procedure may be continually repeated to define a downwardly plug-flowing catalyst bed 10 which is moving in direction of arrow W in FIG. 9.

The procedure to determine whether or not a catalyst bed 10 is plug-flowing may be by any suitable procedure. For example, in a preferred embodiment of the present invention wherein metals (e.g. vanadium) are being removed from a hydrocarbon feed stream, the catalyst bed 10 is plug-flowing if a catalytic sample (e.g. 15 catalytic particulates) from withdrawn catalyst is analyzed and it is found through elemental metal analysis that the catalytic sample has a uniform high metal load, preferably at least about 1.5 times more than the average metal load of the catalyst bed 10, and more preferably at least about 2.0 times more than the average metal load of the catalyst bed 10. Those possessing the ordinary skill in the art can determine the average load of the catalyst bed 10 from the total amount of metals removed from the hydrocarbon feed stream, the weight of the catalytic bed 10, etc.

It is to be understood that whenever the specification or the claims states or mentions any type of catalyst movement or catalyst bed 10 movement (e.g. "removing", "moving", "supplying", "replacing", "delivering", "flow", "flowing", "transfer", "transferring", "addition", "adding", "admixing", etc.) for any type or mixture of catalyst without stating or mentioning the basis, the basis for such type of catalyst or catalyst bed movement may be on any type of basis, such as "intermittent basis", "periodic basis", "continuous basis", "semi-continuous basis", etc. Thus, by way of example only, removal of lowermost volumetric catalytic layers and addition of upper volumetric catalytic layers may be on a "periodic basis", "a continuous basis", or even "a one time basis", all without affecting the spirit and scope of the present invention(s). It is to be also understood that the "removal" or "withdrawal" of catalyst and the "addition" or "replacement" of catalyst are mutually exclusive of each other and may be performed simultaneously or at different times without affecting the spirit and scope and of the present invention(s). Preferably, the "addition" or "replacement" of catalyst is performed after the "removal" or "withdrawal" of catalyst and after the catalyst bed 10 has moved downwardly into a non-moving state or non-moving posture.

Catalysts are selected utilizing data acquired by measuring bed expansion, such as in a large pilot plant run with hydrocarbon, hydrogen and catalyst as described below and illustrated in Example 2.

To further assure that plug flow continues throughout the full length of the bed, and particularly at the bottom portion, bed support means 17 is particularly characterized by the truncated polygonal or conical configuration of support means 17.

Figure 2:
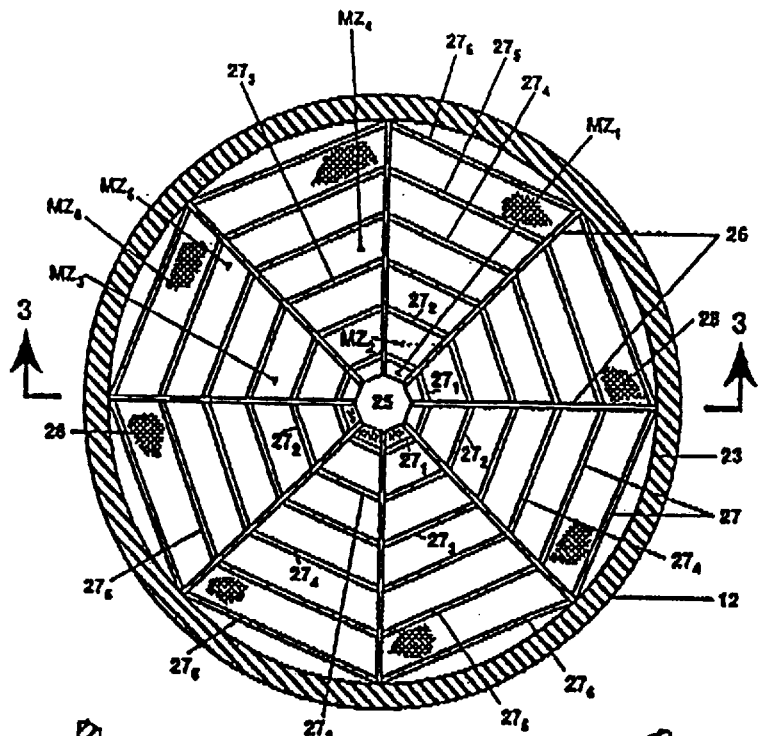
FIG. 2 is a bottom plan view of the concentric and radial catalyst bed support means for a truncated conical or pyramidal screen, taken in the direction of arrows and along the plane of line 2—2 in FIG. 1.
Figure 3:
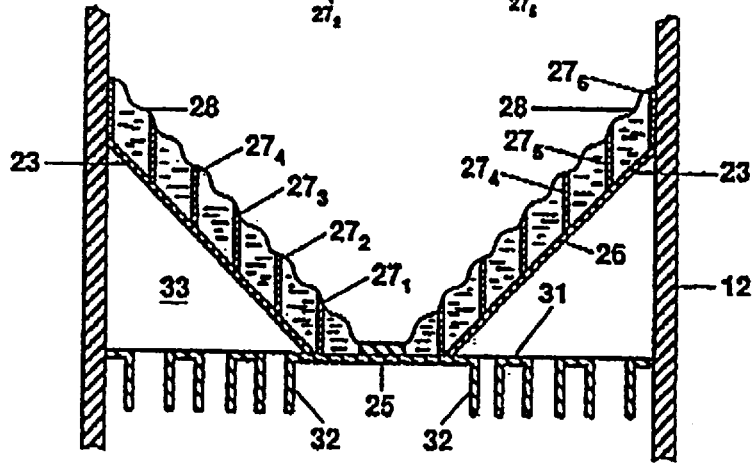
FIG. 3 is an elevational cross-sectional view of the support means and screen taken in the direction of arrows and along the plane of line 3—3 in FIG. 2.

As shown in the preferred embodiment of FIGS. 2 and 3, and as best seen in FIG. 2, support 17 includes a series of annular polygons, approaching the form of annular rings, formed by a plurality of segment plates 27 between radial ribs or spokes 26 extending from imperforate center plate 25 to sidewall 12 of vessel 11. As shown in FIG. 3, spokes 26 may be any suitable geometric shape, such as rod-like (see FIG. 3) or substantially flat plates (see FIG. 10), which divide the circumference of the vessel into many segments (eight in this case) and similarly support the ends of outer octagonal ring 23 of support means 17 formed by annular or circumferential plates 27. In each case, radial ribs or spokes 26, and annular segment plates 27 form a plurality of concentric rings, or annular polygons which support conical, or pyramidal, perforated plate or screen 28. Thus screen 28 is permeable to both gas and liquid rising from the lower portion of vessel 11.

In one preferred embodiment of the particular merit of the concentric annular polygons as illustrated in FIG. 3, the interconnected plates 27 form a plurality of ring-like structures extending generally axially parallel to the sidewall 12 with the radial ribs or spokes 26 radially extending towards the sidewall 12 of reactor vessel 11. The mixture of the hydrocarbon liquid feed and hydrogen gas that is to enter the catalyst bed 10 separates by gravity into radially alternate gas and liquid rings, made up of adjacent segments between each pair or radial spokes 26. Thus, both phases flow upwardly through alternate concentric annular passages under screen 28. The preferential separation of gas from liquid in each ring includes an annular cap segment of gas overlying an adjacent lower annular segment filled with liquid. Hence, both fluids have equal, and angularly adjacent, access to the bed through screen 28. The plurality of alternate annular rings of hydrogen gas and hydrocarbon liquid assure even and equal feed of both phases across the full cross-sectional area of screen 28 into bed 10. Among other factors, we have particularly found that this configuration insures even and equal distribution across the full cross-sectional area of the catalyst bed. Such equal distribution across the full diameter of the bed 10, permits a quiescent flow section to form directly above center plate 25 which truncates conical bed support means 17. This decreases substantially potential local ebullation or eddy currents from being induced in the catalyst bed at the point of catalyst withdrawal through inlet 30 of inverted J-tube 29 to assure localized laminar flow of catalyst and liquid from within bed 10.

Figure 11:
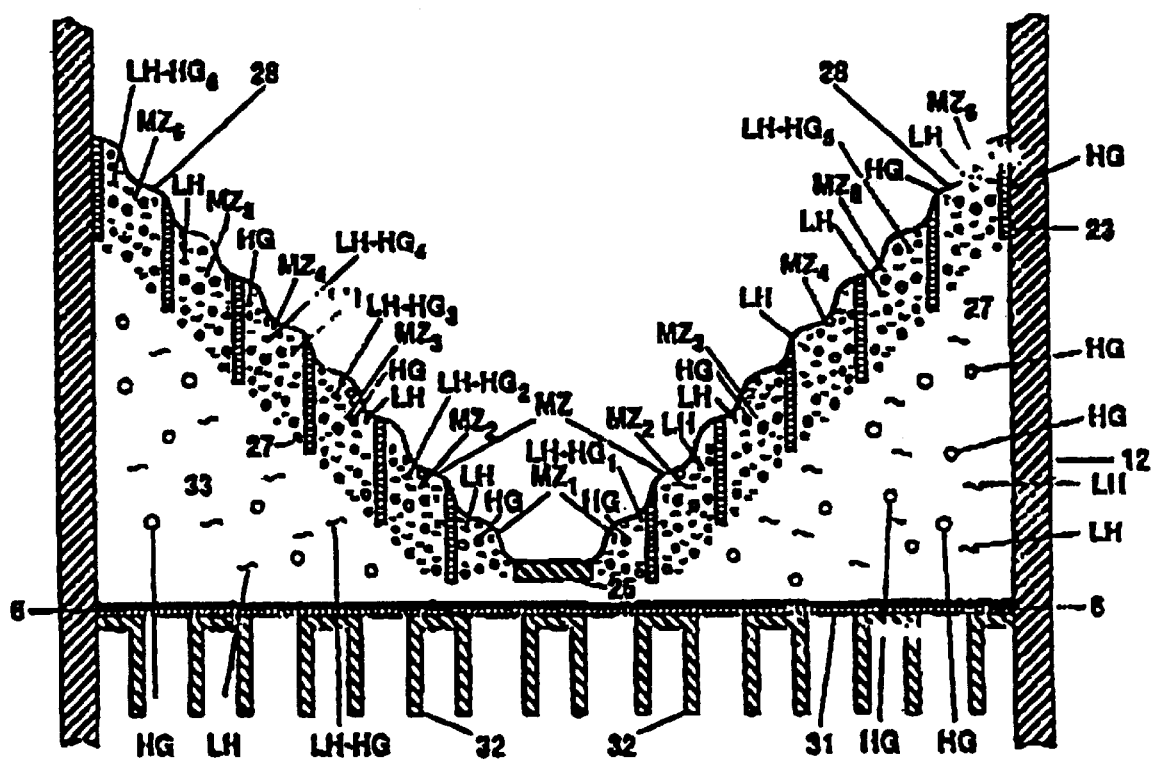
FIG. 11 is a partial cross-sectional view of the reactor and the catalytic support means of FIG. 10 which includes a plurality of annular mixture zones under the substantially packed bed of hydroprocessing catalyst with each annular mixture zone containing a liquid hydrocarbon component and a hydrogen-containing gas component and wherein the annular mixture zones are concentric with respect to each other and are coaxial with respect to the reactor and the substantially packed bed of hydroprocessing catalyst.
Figure 12:
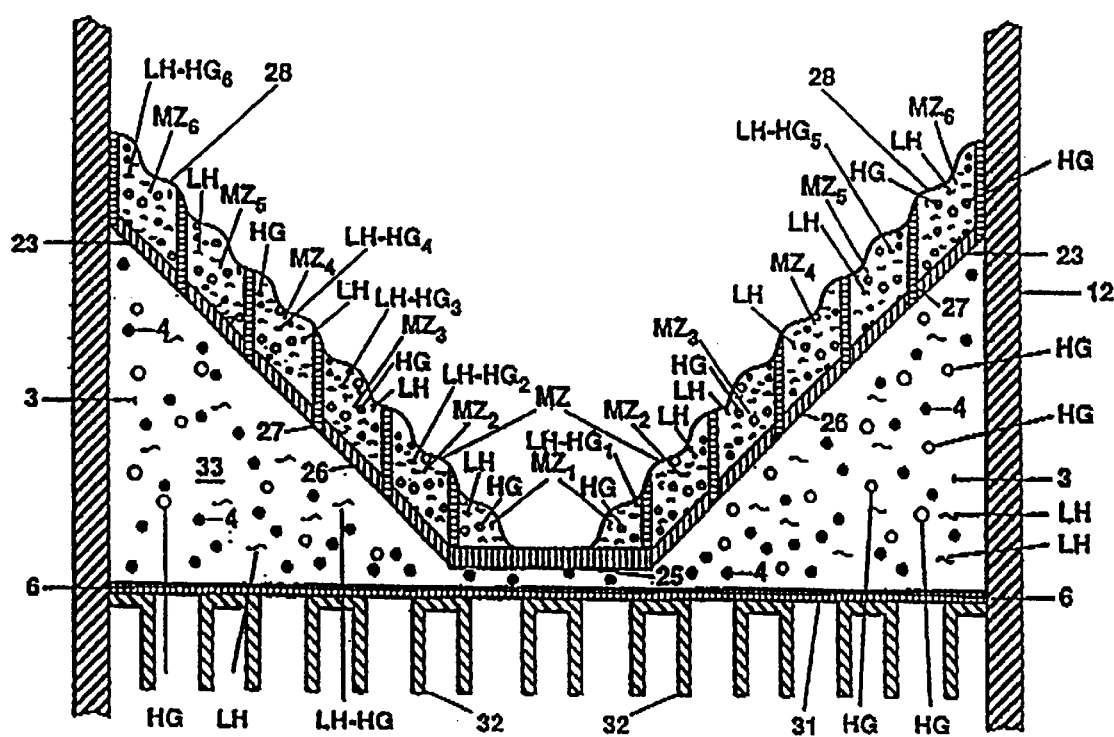
FIG. 12 is the partial cross-sectional view of the reactor and support means in FIG. 11 with the inert pellets, and illustrating ribs or spokes secured to an imperforate center plate and supporting a plurality of segmented plates.
Figure 13:
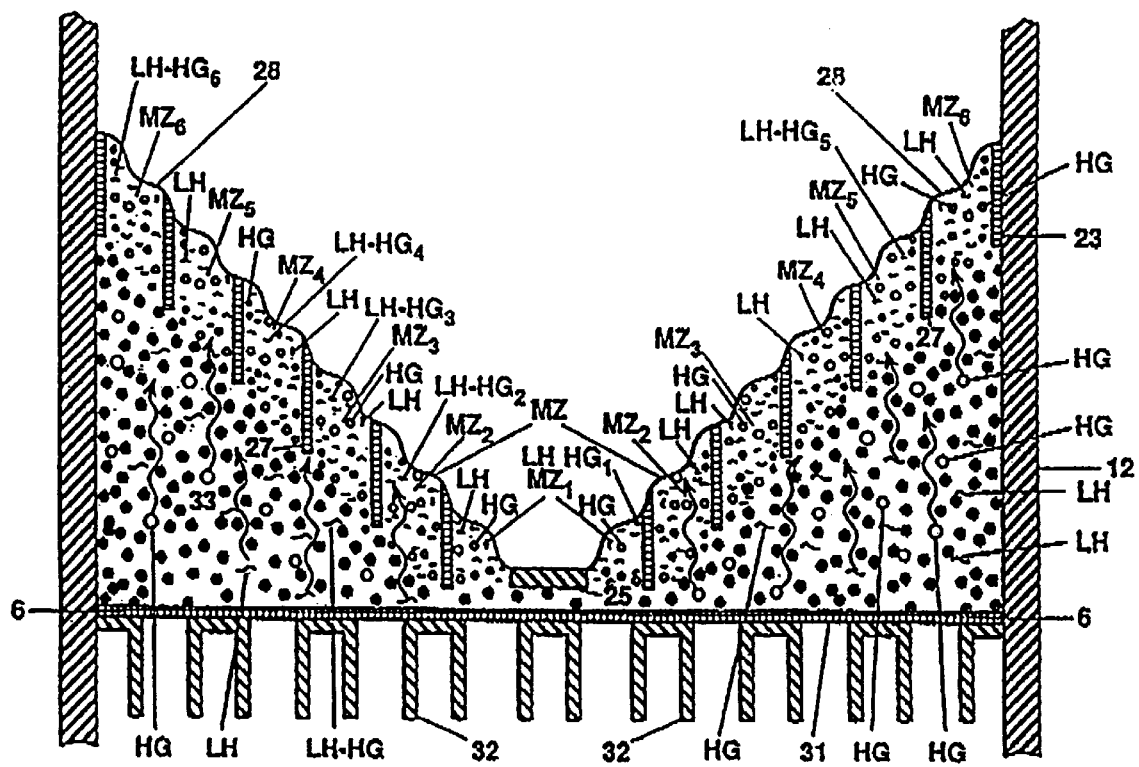
FIG. 13 is another cross-sectional view of the reactor and support means as similarly illustrated in FIG. 12 with a bed of inert pellets having a liquid hydrocarbon component and a hydrogen-containing gas component flowing around the inert pellets for entering the annular mixture zones.

Uniform feed of the mixture of the hydrocarbon feed stream and hydrogen is particularly facilitated to the inlet side of plates 27 of support means 17 through plenum or inlet chamber 33 enclosed between support 17 and circular plate member 31, which extends across the full cross-sectional area of vessel 11. The circular plate member 31 defines a grid-like structure for supporting a permeable screen 6 having one or more openings, as best shown in FIGS. 11, 12 and 13. As further best shown in FIGS. 11, 12 and 13, the permeable screen 6 supports a bed 3 of a plurality of inert pellets 4 (e.g. alumina pellets) which are sized not to pass through the openings in the permeable screen 6, to prevent eddy currents in the plenum chamber 33, and to keep bubbles of hydrogen-containing gas diffused within the hydrocarbon feed streams. Plate 31 includes a multiplicity of similar large diameter tubes 32 forming openings through plate 31. Each tube is several inches in diameter and extends axially to a similar depth, say on the order of 4 to 6 inches, below plate 31. Tubes 32 provide equal access to the mixture of hydrogen and hydrocarbon feed stream into plenum chamber 33. Even distribution of the incoming feed stream into bottom header 35 from feed line 16 may also be assisted by deflector plate 34 to assure that oversized bubbles of hydrogen that may be contained in the feed stream will be equally distributed across the full cross-sectional area of plate 31 and equally distributed to each of tubes 32 for flow into plenum chamber 33. The length of tubes 32 may be selected to form a suitable gas head under plate 31 to suppress surges in the feed streams entering header 35.

As noted above, the vertical, transverse width or axial length of plates 27 which set off each individual annular and radial segment, provide equal access to both hydrogen and liquid feed into catalyst bed 10, and stepped under screen 28 so that they effectively form rings of gas and hydrocarbon feed alternately across the full diameter at the inlet side of catalyst bed 10. In this way, no single area of the inlet to catalyst bed 10 becomes a segregated or preferential, flow path for either gas or the liquid. Further, if pressure surges result in full wetting of screen 28 by the liquid phase, recovery of gas flow is assisted by the areal breadth of each segment between plates 27 and radial plates 26.

In another preferred embodiment of the particular merit of the concentric annular polygons as illustrated in FIGS. 10, 11, 12 and 13, there is seen a liquid hydrocarbon component LH and a hydrogen-containing gas component HG (hydrogen-containing gas bubbles) entering as an LH-HG mixture into the plenum chamber 33 from tubes 32. The LH-HG mixture is introduced into the plenum chamber 33. In this preferred embodiment of the present invention, the annular or circumferential plates 27 are secured to and are supported by the radial ribs or spokes 26, each of which has a vertical or transverse width that is essentially equal to the vertical or transverse width of the annular or circumferential plates 27. The radial ribs or spokes 26 also function as a means for reducing a size of hydrogen-containing gas bubbles, especially over-size hydrogen-containing gas bubbles from the hydrogen-containing gas component HG. Those skilled in the art will readily recognize that the number of radial ribs or spokes 26 employed will depend on a number of factors, such as the anticipated number of over-size hydrogen-containing gas bubbles in the upwardly flowing hydrocarbon feed stream, the weight of the catalyst bed 10, etc. The interconnected plates 27 and radial ribs or spokes 26 form a web or web-like structure defining a plurality of annular mixture zones, generally illustrated as MZ in FIGS. 10 and 11. The annular mixture zones MZ are essentially continuous or are generally endless annular mixture zones MZ, and may contain or be subdivided into any reasonable desired number of mixture zones (or sub-mixture zones), such as $MZ_1$, $MZ_2$, $MZ_3$, $MZ_4$, $MZ_5$, and $MZ_6$ in FIGS. 10 and 11. Each of the individual mixture zones $MZ_1$, $MZ_2$, $MZ_3$, $MZ_4$, $MZ_5$, and $MZ_6$ is for all practical purposes an annularly continuous or endless mixture zone of uniform thickness, excepting a periodic interruption by radially ribs 26, which are relatively narrow vis-a-vis the spaced distance between any pair of contiguous ribs 26—26. As evident in FIGS. 10, 11, 12 and 13, concentric with mixture zone $MZ_1$ and as a partial bottom to same is imperforate center plate 25, which is preferably spaced from and off of the plate 31 and the screen 6 such that inert pellets 4 may be supported by the screen 6 and the plate 31 immediately underneath the imperforate center plate 25. Mixture zone $MZ_1$ is essentially a cylindrical annular mixture zone with an open top and boundaries defined by the space between a plurality of interengaged and coupled plates $27_1$s and the perimeter of the imperforate center plate 25.

The plurality of annular mixture zones MZ (or the annularly continuous or endless mixture zones $MZ_2$s, $MZ_3$s, $MZ_4$s, $MZ_5$s, and $MZ_6$s) under the catalyst bed 10 are concentric with respect to each other and are coaxial with respect to the reactor vessel 11 and the catalyst bed 10. The plates 27 may be radially spaced from each other at any suitable distance (preferably of uniform distance) to assist in accomplishing the desired objects of the present invention; however, preferably the plates 27 are radially spaced from each other at a generally uniform thickness or distance that ranges from about 1 inch to about 4 feet, more preferably from about 6 inches to about 3 feet, most preferably from about 1 foot to about 2 feet. The radially spaced relationship between and among the plates 27 generally defines a uniform thickness for each of the mixture zones (i.e. $MZ_2$s, $MZ_3$s, etc.). It is to be understood that while the plurality of annular mixture zones MZ is represented in FIGS. 2, 3, 10, 11, 12 and 13 as being a plurality of non-circular geometric-shaped zones (e.g. octagonal in FIGS. 2), the spirit and scope of the present invention includes that the plurality mixture zones MZ may comprise any geometric-shaped zones including not only polygonal-shaped zones, but also a plurality of concentric circular mixture zones, etc., all of which would also be concentric with respect to each other and coaxial with respect to the reactor vessel 11 and/or the catalyst bed 10 (or the hydroconversion reaction zone).

Therefore, the plates 27 function to form generally uniform thick and essentially circular bands of concentric hydrocarbon feed streams that are also coaxial with respect to the catalyst bed 10. By way of example only and as best shown in FIGS. 2 and 10, angular mixture zone $MZ_2$ is defined by the eight (8) interengaged or intercoupled plates $27_1$s and the eight (8) interengaged or intercoupled plates $27_2$s. The eight (8) plates $27_1$s and the eight (8) plates $27_2$s each form an annulate boundary for the essentially circular band of hydrocarbon feed stream in mixture zone $MZ_2$. Because the spacing or distance between plates $27_1$s and $27_2$s is generally circumferentially uniform, the thickness or size of the essentially circular band of hydrocarbon feed stream in mixture zone $MZ_2$ is essentially uniform transversely and/or equal in transverse or horizontal cross section. Similarly, mixture zone $MZ_6$ is defined by the eight (8) interengaged or intercoupled plates $27_5$s and the eight (8) interengaged or intercoupled plates $27_6$s, the combination of which form annulate boundaries for the essentially circular band of hydrocarbon feed stream in mixture zone $MZ_6$. As was previously similarly indicated for plates $27_1$s and $27_2$s, because the spacing or distance between plates $27_5$s and $27_6$s is generally circumferentially uniform, the thickness or size of the circular band of hydrocarbon feed stream in mixture zone $MZ_6$ is essentially uniform transversely and/or equal in transverse or horizontal cross section. Plates $27_2$, $27_3$, $27_4$, and $27_5$ similarly functionally interengage and intercouple to define annulate boundaries for mixture zones $MZ_3$, $MZ_4$, and $MZ_5$. As indicated and as best shown in FIG. 2, ribs 26 extend radially from imperforate center plate 25 and planarly represent visually pie-shaped segments. Between any pair of contiguous ribs 26—26, the lengths of the respective plates 27 increase from plate $27_1$ to or towards plate $27_6$ while the widths are essentially the same as best shown in FIG. 3. Thus, plate $27_2$ is longer than plate $27_1$ while possessing the identical approximate width. Likewise: plate $27_3$ is longer than plate $27_2$, plate $27_4$ is longer than $27_3$, plate $27_5$ is longer than plate $27_4$, and plate $27_6$ is longer than plate $27_5$, while all the plates 27 simultaneously have generally the same width or the same longitudinal extension below the screen 28 (see FIG. 3). Thus, the vertical dimensions or the widths of the plates 27 (i.e. the structural extensions of the plates 27 that are generally parallel to the longitudinal axis of the reactor vessel 11 and/or the catalyst bed 10 therein) are generally equal. All plates 27 are preferably spaced such that the hydrocarbon feed stream flows parallel to the longitudinal axis of the catalyst bed 10 before contacting and entering the same. Both the upper edges and lower edges of plates $27_1$s, $27_2$s, $27_3$s, $27_4$s, $27_5$s, and $27_6$s are all at a different level or height, as best shown in FIGS. 3 and 11. The mixture zones MZ differ from a plurality of tubes, conduits, or pipe-like passages for introducing an essentially complete or essentially total integral cylindrical hydrocarbon feed stream into the catalytic bed 10. As best shown in FIGS. 3 and 11, the upper and lower edges of plates $27_1$s are at a different level or height than the upper and lower edges of plates $27_2$s which are at a different level or height than the upper and lower edges of plates $27_3$s. Similarly, the upper and lower edges of plates $27_3$s are at a different level or height than the upper and lower edges of plates $27_4$s which are at a different level or height than the upper and lower edges of plates $27_5$s. The upper and lower edges of the latter are at a different level or height than the upper and lower edges of plates $27_6$s.

After the LH-HG mixture enters and flows through the screen 6 into the plenum chamber 33, the flowing LH-HG mixture enters into each of the generally continuous annular mixture zones $MZ_2$s, $MZ_3$s, etc. for dividing or separating the flowing LH-HG mixture into a plurality of flowing generally continuous annular LH-HG mixtures, which have been designated $LH-HG_2$, $LH-HG_3$, $LH-HG_4$, $LH-HG_5$ and $LH-HG_6$ in FIG. 11. As was previously indicated, the mixture zone $MZ_1$ is also basically an annular or cylindrical shaped mixture zone defined by the space between the perimeter of the imperforate center plate 25 and intercoupled segmented plates $27_1$s and receives hydrocarbon feed stream (i.e. hydrocarbon liquid feed and/or hydrogen gas) in and through the space by which it is being defined. In a preferred embodiment of the present invention and as best shown in FIG. 13, before the flowing LH-HG mixture enters into each of the generally continuous annular mixture zones $MZ_1$s, $MZ_2$s, $MZ_3$s, etc. the LH-HG mixture flows around the plurality of inert pellets 4 in zig-zag fashions for reducing the possibility of eddy currents and for keeping bubbles of hydrogen gas diffused within the liquid hydrocarbon and preventing agglomeration of same into larger size bubbles. The hydrocarbon feed stream entering into mixture zone $MZ_1$ is designated $LH-HG_1$. The plurality of LH-HG mixtures (i.e. $LH-HG_1$, $LH-HG_2$, etc.) pass through the screen 28 and respectively enter into the catalyst bed 10 from each of the mixture zones (i.e. $MZ_1$s, $MZ_2$s, $MZ_3$s, etc.) at a flow rate such as not to ebullate, levitate or expand the catalyst bed 10 upwardly and/or towards the screen 15 and the domed head 14 by more than 10% by length beyond substantially the full axial length of the bed catalyst 10 in a packed bed state, such as the packed bed state reflected in FIG. 8. The plurality of generally continuous annular LH-HG mixtures flow upwardly through screen 28 and into the catalyst bed 10. The catalyst bed 10 in the present invention preferably comprises catalyst particles which are substantially the same and/or uniform size, shape, and density and which are selected in accordance with the average optimum velocity of the hydrocarbon feed stream (i.e. a mixture of a liquid hydrocarbon component LH and a hydrogen-containing gas component HG, or the continuous annular LH-HG mixtures) flowing into the plenum chamber 33 and subsequently into and through the plurality of mixture zones $MZ_2$s, $MZ_3$s, etc. The rates of flow of the plurality of the respective LH-HG mixtures (i.e. $LH-HG_1$, $LH-HG_2$, etc.) from the respective mixture zones $MZ_1$s, $MZ_2$s, etc., and thus also the flow rates of the hydrocarbon feed stream into plenum chamber 33 from and through line 16, are all to be controlled in an amount and to an extent sufficient to maintain expansion or levitation of the catalyst bed 10 to less than 10% by length over or beyond substantially the full axial length of the bed 10 in a packed bed state. More preferably, the expansion of the substantially packed bed of catalyst is limited to less than 5%, most preferably less than 2% or even less than 1%, by length over or beyond substantially the full axial length of the bed 10 in a packed bed state. Ideally the expansion of the substantially packed bed of catalyst is limited to essentially 0% by length.

The flow rate of the hydrocarbon feed stream through line 16 is to be at a rate not substantially greater than the optimum rate of flow. The optimum rate of process fluid flow through the substantially packed bed of catalyst will vary from process unit to process unit based on several factors including oil and hydrogen feed characteristics, catalyst specifications, process objectives, etc. Based on catalyst particles having substantially the same and/or uniform size, shape and density, the superficial flow velocity of the hydrocarbon feed stream through the catalyst bed preferably ranges from about 0.01 ft/min to about 10.00 ft/min and more preferably from about 0.05 ft/min to about 2.00 ft/min. Similarly and/or likewise and further based on the catalyst particles having substantially the same and/or uniform size, shape, and density, the superficial flow velocity of the vapor component of the continuous annular LH-HG mixtures (i.e. the summation of the flow rates for $LH-HG_1$ through $LH-HG_6$ from mixture zones $MZ_1$s through $MZ_2$s respectively in FIG. 11) through the catalyst bed is to be at a rate not substantially greater than the optimum rate of flow, preferably ranging from about 0.005 ft/sec to about 10.00 ft/sec, and more preferably from about 0.01 ft/sec to about 1.00 ft/sec. The specific flow rate would depend as indicated on a number of variables, such as the particular application (e.g. demetallation or desulfirization etc.) of the hydroprocessing process. The specific flow rates however would be at any suitable rate controlled in an amount and to an extent sufficient to limit expansion of the substantially packed bed of catalyst to less than 10% by length over or beyond a substantially packed bed of hydroprocessing catalyst in a packed bed state.

In a preferred embodiment of the invention and for such a flow rate for the hydrocarbon feed stream and for such a flow rate for the continuous annular LH-HG mixtures, the catalyst particles preferably have the substantially same and/or uniform size, shape and density in order to obtain over the desired demetalization and/or desulfirization and/or denitrofication of the liquid hydrocarbon component LH in the hydrocarbon feed stream (i.e. LH-HC mixture) into produced hydrogen upgraded product fluids that are being withdrawn from the reactor vessel 11 through the exit pipe 18. At the above indicated flow rates for the hydrocarbon feed stream flowing through line 16, and for the flow rates for the generally continuous annular LH-HG mixtures (i.e. $LH-HG_1$, $LH-HG_2$, etc.), the produced upgraded product fluids are being withdrawn through the exit pipe 18 from the reactor vessel 11. The superficial velocity of the LH-HG components at the top of the Catalyst Bed 20 ranges from about 0.01 ft/min to about 10.00 ft/sec and more preferably from about 0.01 ft/min to about 1.00 ft/sec. The withdrawal rate(s) of the produced upgraded product fluids is not to be greater than the optimum rate of flow and will also vary from process unit to process unit based on several factors including oil and hydrogen feed characteristics, catalyst specifications, process objectives, etc. The specific withdrawal rate(s) would be any suitable withdrawal rate, controlled in an amount and to an extent sufficient to prevent and/or limit expansion of the substantially packed bed of catalyst to less than 10% (more preferably less than 5%, most preferably less than 2% or even less than 1%) by length over or beyond substantially the full axial length of the bed 10 in a packed bed state.

The arrangement in inlet distributor 31 for uniformly distributing hydrogen gas and liquid hydrocarbon feed as shown in FIG. 3 and FIGS. 8 and 9 may be modified by lengthening or shortening tubes 32, forming uniformly distributed cylindrical passageways into plenum chamber 33. A particular advantage of using tubes 32, as compared to merely perforations or holes of adequate diameter, lies in the formation of a gas pocket under plate 31 in the areas around the individual tubes 32. We have found that this is desirable because such a gas pocket trapped beneath tray or plate 31 provides pressure surge dampening, which may result from flow changes of the mixture of hydrogen and liquid being supplied to the reactor vessel. However, the length of the tubes 32 is maintained as short as reasonably possible to so function. Again, this is because of the desirability of utilizing as little as possible of all processing space available in vessel 11 for anything but contacting the feed streams with conversion catalyst. A particular advantage to using tubes 32, as compared to a combination of tubes and perforations, is that the designed flow distribution pattern is maintained over a wider range of flow rates. With tubes and perforations, gas normally flows up the perforations and liquid flows up the tubes. However, gas will find new flow paths through the tubes if the gas flow increases or the perforations become plugged, resulting in new and potentially undesirable flow patterns.

Figures 5, 6, 7:
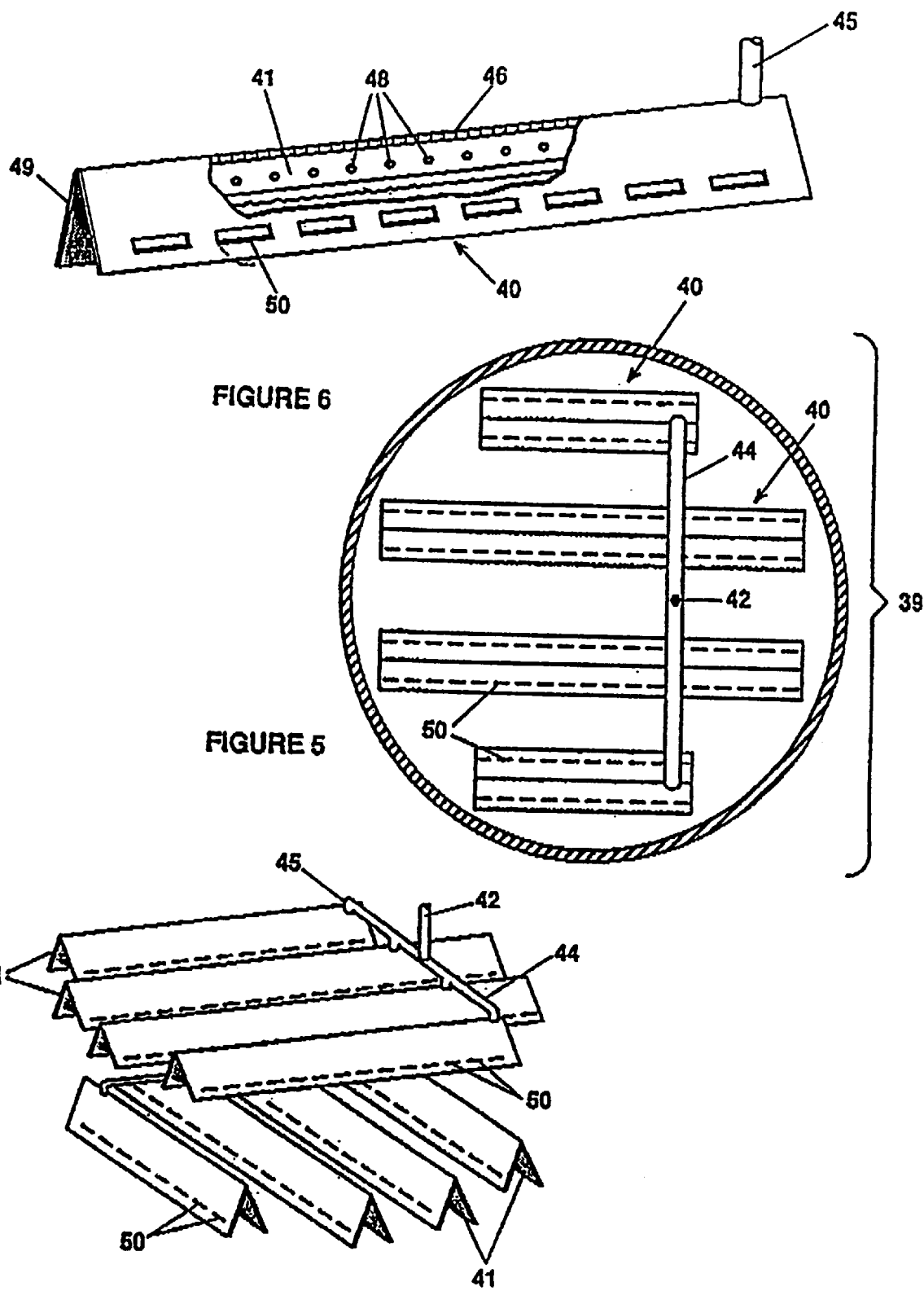
FIG. 5 is a cross-sectional plan view of the reactor vessel taken in the direction of arrows and along the plane of line 5—5 in FIG. 1 showing a preferred form of gas redistribution and quench system over a central portion of the catalyst bed.
FIG. 6 is a perspective view, partially in cross-section, of one of the quench or redistribution shed units shown in FIG. 5.
FIG. 7 is a perspective view of a preferred arrangement of two tiers of shed units of FIG. 5 at a given level in the catalyst bed.

To further assist in maintenance of plug-like flow of catalyst bed 10 throughout its axial length, there is additionally provided in a preferred form or embodiment of the invention a plurality of axially spaced apart hydrogen gas redistribution or hydrogen gas-quenching stages 39 within bed 10. In the arrangement of FIG. 1, the location of one of the gas redistribution stages 39 is illustrated by the single inverted angle member 40 extending transverse to the axis of bed 10. The details of quench system 39 are best seen in FIGS. 5 to 7 where a plurality of inverted V-shaped sheds 40 (i.e. inverted angle members 40) are equally distributed over at least one transverse row extending generally across the cross-sectional area of vessel 11. As shown in FIG. 6 and in FIG. 7, a gas injection line 42 feeds an elongated tube 41 extending through each individual shed 40 from a header 44 and branch lines 45 supplying the individual tubes 41. Desirably, but not necessarily, a second tier of sheds 40 is axially spaced above the first tier, with the sheds 40 in each tier being positioned at 90 degree(s) to the other tier, as shown in FIG. 7. Construction of an individual shed 40 is best seen in FIG. 6, wherein distribution pipe 41 includes a plurality of discharge holes 48, desirably proportioned to give equal distribution of hydrogen gas along the full length of tube 41. Desirably, holes 48 are on the top side of tube 41 so that gas leaving the tube is forced to flow downwardly within shed 40 to join gas rising from bed 10 under the area enclosed by the V-sides 49 of shed 40. Preferably, the full length of each skirt formed by sides 49 includes equally spaced slots 50 to exhaust both rising gas from bed 10 and quench gas entering from line 42. A particular value of the present arrangement is that gas which may have become channeled in a portion of the bed below the quench system can be redistributed across the full cross-sectional area of the bed to further avoid generation of local hot spots, eddy currents, or ebullation, within the upper portion of bed 10.

In accordance with another significant aspect of the present invention, FIG. 1 shows a catalyst replacement system, which in general comprises a series of lock chambers for transferring fresh catalyst into bed 10 through a pair of pressure lock chambers, including charging vessel 60 and supply vessel 70. A similar series of lock chambers, including discharge vessel 80 and disposal vessel 90, transfer catalyst out of bed 10. If necessary, a single pair of vessels could be used to charge and discharge the catalyst, although the piping and sequencing procedure would be more complex. In both cases, transfer flow is specifically designed to be as a liquid slurry and laminar to avoid undue abrasion of catalyst particles going into reactor vessel 11 and to avoid abrupt agitation of the overlying bed of particles, with consequent ebullation and eddying of catalyst or fines in bed 10, when catalyst is withdrawn through inlet 30 of J-tube 29 at the bottom of reactor vessel 11.

To achieve laminar flow for supply of catalyst from charging vessel 60 to the top of reactor vessel 11 or for catalyst removal from the bottom of bed 10 to discharge vessel 80, it is essential that the pressure differential between reactor vessel 11 and vessels 60 or 80, be accurately controlled as by detecting the pressure differences between supply line 61 or discharge line 82 and reactor vessel 11. The pressure difference is best zero when shut-off valves 64 or 84 are first opened or closed. The pressure differences between vessel 11 and line 61 is measured by gage 63 and pressure detectors 62 and 65. Differential pressure gage 83 and detectors 81 and 85 serve a similar function to control transfer of catalyst through valve 84 from the bottom of reactor vessel 11 to discharge vessel 80.

With reference particularly to supply of catalyst from vessel 60, it will be understood, of course, that the vessel 60 is capable of being brought to a slightly higher pressure than the operating pressure of reactor vessel 11, and closely controlled to assure that catalyst supplied to vessel 60 from supply vessel 70 is by laminar flow. For this purpose, as indicated, vessels 70 and 60 are at atmospheric pressure, catalyst is first introduced into supply vessel 70 by way of funnel 100 through line 101 and valve 102, and nitrogen is preferably flushed through supply vessel 70 through line 106 and/or line 71 to eliminate air and moisture that may be present on the catalyst. Either before or after catalyst is introduced, vessel 70 is charged with a distillate hydrocarbon stream preferably gas oil, to provide the necessary slurrying liquid for mixing and transporting catalyst. This may either be through funnel 100, valve 102, and line 101, or through line 104, valve 105 and line 106. Valve 102 is then closed and the catalyst is then preferably heated to dehydrate and eliminate water from the catalyst. It is to be understood that whenever the specification or the claims states, mentions, or implies "mixing" or "admixing" or "commingling", or any of the like, including of any type(s) of catalyst, such stated, mentioned, or implied verbiage means within the spirit and scope of the present invention any type of "mixing" or "admixing" or "commingling", or any of the like, including any incidental mixing or any otherwise non-thorough/non-homogeneous mixing. Preferably, however, any type of "mixing" or "admixing" or "commingling", or any of the like, will be essentially thorough and/or essentially homogeneous.

An important requirement is that before transferring liquid to the charging vessel 60, the pressure in supply vessel 70 must be equalized to that in charging vessel 60, assuming, of course, that isolation valve 64 between vessel 60 and the reactor vessel 11 is closed, and also that valves 67, 68 and 78 are closed. With valves 64, 67, 68, 78 and 102 closed and pressure equalized between the vessels 60 and 70, transfer valve 75 may be opened to provide the same diameter path for the catalyst slurry to flow throughout the path from J-tube 71 to vessel 60. The transfer is closely controlled by regulating the nitrogen gas flow rate and pressure introduced from line 104 through valve 105. The pressure and flow rate are just sufficient to assure the desired laminar flow of catalyst into inlet 72 of J-tube 71 and thus upwardly through line 76 and into charging vessel 60, which forms a catalyst charging vessel. Laminar flow to transfer catalyst through J-tube 71 is entirely in the liquid phase, with the catalyst as a slurry in the gas oil. Transfer of all catalyst is assisted by the funnel shape of bottom 79 of vessel 70, and the position of intake 72 to J-tube 71 at the apex of bottom 79. If all the catalyst in vessel 70 is transferred to vessel 60, flush oil from vessel 70 will naturally clear all the catalyst out of line 76. However, to assure that all such catalyst has passed through valve 75 (so that valve 75 need not close on hard, abrasive catalyst with potential danger of scoring the valve 75 or the valve seat therein) additional flush fluid is preferably introduced from line 77 through valve 78 to clear line 76, either back into vessel 70, or forward into vessel 60.

With catalyst thus loaded into vessel 60, a similar procedure is used for transferring catalyst under laminar flow conditions as a liquid slurry into reactor vessel 11 through supply pipe 61 for distribution to the top 20 of bed 10. If desired, of course, a deflector plate (not shown) may be used to distribute catalyst evenly across the top of catalyst bed 20. However, we have found that such a distribution aid is not required. In the transfer of catalyst from the charging vessel 60 to reactor vessel 11, it will be understood that the pressure in vessel 60 is brought to the pressure of reactor vessel 11. This is done by injecting process hydrogen through valve 67. The oil should be heated to a temperature as close as possible to the temperature of reactants in vessel 11, without vaporizing the oil. We have found this to be particularly important to minimize any disturbance of the hydroprocessing process when fresh catalyst is added to an onstream reactor vessel, such as reactor vessel 11. Once these requirements are met, valve 64 should be opened for transfer. The actual laminar transfer of the liquid slurry is controlled by valve 67 throttling the flow and pressure of hydrogen admitted from line 66. After transfer of the catalyst, valve 68 in flush line 69 is opened briefly to assure that any catalyst left in lines 61 and 19 is cleared before valve 64 is closed, for the reasons noted before. Excess hydrogen pressure in vessel 60 may be relieved in a controlled manner via a suitable bleed line running back to the common hydrogen source (not shown) of the hydroprocessing system.

Substantially continuous or intermittent transfer of deactivated catalyst for regeneration or disposal from the bottom of catalyst bed 10 in reactor vessel 11 to discharge vessel 80 is controlled in the same manner. As in all transfer of catalyst throughout the system of the present invention depicted in FIG. 1, the flow path from inlet 30 of J-tube 29, through line 82, including the bore of valve 84, is uniform in cross-sectional area and diameter. Similarly, transfer from discharge vessel 80 to disposal vessel 90 is through inlet 89 of J-tube 86 to discharge outlet 98 of line 92, including valve 94, into vessel 90. Deactivated catalyst is transferred laminarly from the bottom of the catalyst bed 10 as a slurry in the hydrocarbon feed stream which, as previously mentioned, comprises the liquid hydrocarbon feed stream or a mixture of hydrocarbon liquid feed and hydrogen-containing gas. Typically, the catalyst is transferred essentially in the liquid hydrocarbon feed stream (i.e. the liquid component of the hydrocarbon feed stream).

In general the diameter of these laminar flow passageways are at least five times, and may be as high as fifty or more times, the diameter of the individual particles to be passed therethrough. In this connection to avoid jamming or obstruction, the inlets 72, 109, 30, 89 and 99 into their respective tubes 71, 108, 29, 86 and 96 are not flared or otherwise restricted, or perforated, so that all flow is solely and directly through the full and equal bore of such inlets. In the case of catalyst removal from reactor vessel 11, inlet 30 of tube 29 is positioned at and over unperformed center plate 25 of catalyst support screen means 17, so that it is out of the direct flow of any hydrogen gas stream rising through the innermost annular passageway formed by walls 27 and radial ribs or spokes 26. This assures that flow into entry 30 is substantially a liquid only slurry mixture with catalyst particles. Such a mixture at laminar flow conditions produces maximum carrying capacity of the fluid. Additionally, the external dimensions of the circular bend or arc portion of the J-section of the tube 29 is several times the diameter of inlet 30 and the connected flow path, including the downwardly directed portion. The portion of tube 29 above inlet 30 is many times shorter and smaller in volume than the remainder of J-tube 29, down to, and including, control valve 84. A particular advantage of keeping this portion of tube 29 small is to avoid the necessity of forcing substantial amounts of catalyst back into the bed 11 against the gravity head of catalyst bed 10 when that portion of the line is cleared at the end of each transfer.

Desirably, during periods when the catalyst is not being transferred, a small amount of hydrogen may be continually bled through valve 88 into bed 10 through J-tube 29 to assure that catalyst particles do not clog entry 30. This avoids potential build up of coke at entry 30 of pipe 29. Such an arrangement assures that catalyst can be withdrawn by laminar flow without artificially fluidizing or levitating bed 10 directly adjacent to J-tube entry 30.

Because gravity drainage of catalyst by an opening through the center of the catalyst support screen means 17 is not required in the present arrangement, as in the prior art, it is possible to operate the entire system without use of solids handling valves. Accordingly, each of the transfer valves in the present arrangement are preferably conventional ball valves formed with a single through bore in a rotatable ball. Specifically, we have found that conventional valves used to feed and control flow of hydrocarbons, catalyst and hydrogen, into and out of the vessel 11, must seal against high pressure differentials between the vessel and the transfer vessels. For this service, a solid satellite, spherical-ball valve having a through bore of the same diameter as the inlet and outlet lines to the valve and metal-to-metal seals, provides superior service when used in the catalyst transfer lines for carrying out the method of the present invention. Further, their commercial cost and ready availability for such severity of service makes them most useful economically, both for initial installation and for service replacement. Valves manufactured by The Kaymr and Mogas Companies, called full-port valves are particularly useful in the present embodiment. Further, the arrangement permits transfer of catalyst almost exclusively in a liquid phase which substantially reduces abrasion or comminution of catalyst particles during transfer. Additionally, exclusion of entrained gas substantially improves the efficiency of liquid transfer of catalyst particles and further reduces potential damage to the catalyst.

Figure 4:
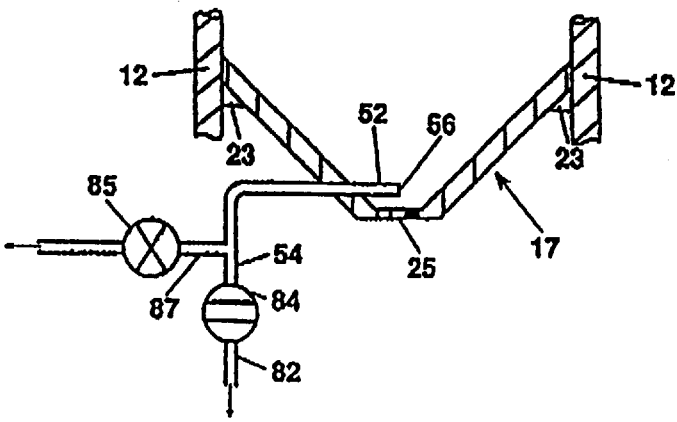
FIG. 4 is a partial elevational view of an alternate form of a laminar flow arrangement for withdrawing deactivated catalyst particles from the reactor bed.

FIG. 4 illustrates a partial view of the bottom of pyramidal catalyst bed support means 17 showing an alternate system for transferring catalyst in a laminarly flowing liquid. In this embodiment, an L-valve is formed by vertical tube 54 and horizontal tube 52 for withdrawing catalyst particles from the bottom of bed 10. As shown, intake 56 is preferably directly above the central, non-perforated, section 25 of the truncated pyramid formed by support means 17. While such an arrangement is less preferred than that shown in the embodiment of FIG. 1, such an arrangement is made suitable by the fact that the slurry of liquid and catalyst can be made to flow only under laminar flow conditions. With either the J-tube of FIG. 1, or the L-valve of FIG. 4, arrangements, the pressure in discharge vessel 80 is brought up to equal that in reactor vessel 11. Valve 84 is opened and catalyst flow is controlled, as seen in FIG. 1, by regulating flow through valve 93. Such flow decreases the gas-pressure in discharge vessel 80 and line 82 sufficiently to induce a laminar flow of catalyst particles from vessel 11 when transfer valve 84 is opened. After valve 84 has been flushed with vacuum gas oil through valve 88 and line 87 and then closed. The pressure in vessel 80 is then reduced to a lower pressure (about 50 psig or less). The residuum is drained from discharge vessel 80 through drain line 120, below J-tube 86 and conical screen 121. Flush oil is then sent in through valve 93 to wash residuum off the catalyst and to cool the catalyst. The discharge vessel 80 can be drained and filled as many times as needed. The pressure in disposal vessel 90 is made equal to that in vessel 80 and valve 94 is opened. The flow and pressure are then controlled through valve 110 to induce laminar flow of catalyst through J-tube 86 and into disposal vessel 90. Valve 94 is flushed with flush oil through valve 107 and closed. The contents of the disposal vessel 90 is preferably washed and cooled with flush oil which is then drained through drain line 122 below conical screen 123. The spent catalyst contents of the disposal vessel 90 is then washed with water if desired through valve 110. The disposal vessel 90 should be purged of any hydrogen by sending in nitrogen gas also through valve 110. Finally, disposal vessel 90 is nearly depressurized and the catalyst is dumped using water as the carrier fluid through J-tube 96 by nitrogen flow through valve 110 to control the rate of catalyst flow in discharge pipe 124.

Continuing to refer to the drawings for other preferred embodiments of the present invention, a method is provided for maximally occupying a reactor volume with a substantially packed bed of hydroprocessing catalyst (e.g. catalyst bed 10) during hydroprocessing by contacting the substantially packed bed of hydroprocessing catalyst with an upflowing hydrocarbon feed stream having a liquid component and a hydrogen-containing gas component. The substantially packed bed of hydroprocessing catalyst, preferably comprising the catalyst of the present invention as more particularly described below under the subtitle "The Catalyst", is disposed in a reactor zone (or reaction zone or zone for reaction) contained within a reactor volume (e.g. the entire internal volumetric space available within the reactor vessel 11) such that the substantially packed bed of hydroprocessing catalyst occupies from about 50% by volume to about 98% by volume of the reactor volume; more preferably from about 50% by volume to about 98% by volume; most preferably at least about 90% by volume or from about 90% by volume to about 95% by volume of the reactor volume. Stated alternatively, hydroprocessing catalyst is disposed or otherwise positioned within a reactor volume such that hydroprocessing catalyst occupies from about 50% by volume to about 98% by volume of the reactor volume; more preferably from about 50% by volume to about 98% by volume; most preferably at least about 90% by volume or from about 90% by volume to about 95% by volume of the reactor volume. "Reactor volume" (or the entire internal volumetric space available within the reactor vessel 11) means or may be generally defined as the volumetric space within the reactor vessel 11 (or any similar hydroprocessing reactor vessel), including the summation or addition of the following internal volumes: (i) an internal volume within the reactor vessel 11 represented by a volume (or internal cylindrical volume or main body volume of the reactor vessel 11) spanning or extending from an upper tangent line 180 (see FIG. 8) to a lower tangent line 182 and generally illustrated as arrow TL in FIG. 8; and (ii) an internal volume within the upper dome closure end 14 (or hemispherical head) of the reactor vessel 11; and (iii) an internal volume within the lower dome closure end 13 (or hemispherical bottom) of the reactor vessel 11. A "tangent line" is known to those skilled in the art as a plane (i.e. horizontal plane) taken generally along the junctures of the sidewall 12 (which is essentially a straight upright wall) of the reactor vessel 11 with the upper and lower dome closure ends 14 and 13 respectively.

A hydroprocessing feed stream including a liquid component and a hydrogen-containing gas component upflows into the substantially packed bed of hydroprocessing catalyst at a rate of flow such that expansion of the substantially packed bed of hydroprocessing catalyst is limited to less than 10% by length beyond a substantially fill axial length of the substantially packed bed of hydroprocessing catalyst in a packed bed state. A volume of the hydroprocessing catalyst is withdrawn from the reactor zone to commence essentially plug-flowing downwardly of the substantially packed bed of hydroprocessing catalyst within the reactor zone; and hydroprocessing replacement catalyst is added to the essentially plug-flowing downwardly, substantially packed bed of hydroprocessing catalyst at a rate to substantially replace the volume of the withdrawn hydroprocessing catalyst. The procedure may be repeated as many times as desired, even continuously repeated during continual hydroprocessing.

Another method is provided for hydroprocessing a hydrocarbon feed stream that is upflowing through a hydroconversion reaction zone having a substantially packed bed of catalyst which comprises forming a plurality of annular mixture zones under a hydroconversion reaction zone having a substantially packed bed of hydroprocessing catalyst such that each of the annular mixture zones contains a hydrocarbon feed stream having a liquid component and a hydrogen-containing gas component and wherein the annular mixture zones are concentric with respect to each other and are coaxial with respect to the hydroconversion reaction zone. The hydrocarbon feed stream from each of the annular mixture zones is introduced into the substantially packed bed of hydroprocessing catalyst to commence upflowing of the hydrocarbon feed stream from each of the annular mixture zones through the substantially packed bed of the catalyst.

Considering the range of hydroconversion systems and/or hydroconversion reaction zones which could benefit from the preferred embodiments of the present invention, one skilled in the art will appreciate the variety of catalysts, having a variety of physical properties and elemental compositions, which could be used in such a range of systems. It is within the spirit and scope of the present invention to encompass these systems employing catalysts having a size, shape and density which vary widely from system to system. However, it is important for the present preferred embodiment that the catalyst particles be of uniform and/or same size, and shape (same density when in fresh catalyst state) within a single hydroconversion reaction zone of a hydroconversion system, in order to achieve the desired catalyst and hydrocarbon flow patterns within the hydroconversion reaction zone. A detailed description of the preferred catalyst is presented below under the subtitle "THE CATALYST". It is to be understood that whenever the specification or the claims states, mentions, or implies "fresh catalyst", such stated, mentioned, or implied "fresh catalyst" means within the spirit and scope of the present invention any type of catalyst having any usable catalyst life or activity (e.g. regenerated catalyst, rejuvenated catalyst, partially fouled catalyst obtained from any source, etc.). Preferably, "fresh catalyst" means a type of catalyst that has never been used before and is obtained directly from a manufacturer with the lowest desired density and the highest desired catalyst life or activity.

A hydroconversion system and/or a hydroconversion reaction zone of a present preferred embodiment of the present invention contains a catalyst which is described in detail below under the subtitle "The Catalyst", and may also be operated as a fixed bed (i.e. a catalyst bed which does not expand), a moving bed, an ebullated bed, an expanded bed or a fluidized bed configuration. A moving bed system is preferred.

By "moving bed", as used herein, is meant a reaction zone configuration in which a catalyst is added at one end of a catalyst bed in an intermittent or substantially continuous manner and is withdrawn at the other end in an intermittent or substantially continuous manner. A "moving bed" also includes a "plug-flow" or "plug flowing" catalyst bed 10 or substantially packed bed of catalyst. As previously indicated, when any type of catalyst or catalyst bed 10 movement is mentioned, stated, or implied, the spirit and scope of the present invention includes such type of movement on any type of basis or in any manner (e.g. "periodic", "fully continuous", "non-continuous" etc.) without the necessity of having to specifically mention the type of basis or manner. Preferably, catalyst is added at the top of the reaction zone and withdrawn at the bottom. In the type of moving bed to which the present preferred embodiment is directed, the catalyst particles in the bed are substantially in contact with one another and plug-flow downwardly. The catalyst bed is not significantly expanded when process fluids (e.g., liquid and gas) passes through it. It has essentially the character of a fixed bed except for maybe a slight expansion upwardly and for the addition and removal of catalyst. As the term is used herein, a "moving bed" is not the same as a "fluidized bed", "ebullating bed" or "expanded bed". In fluidized beds, the flow rate of a single phase fluid, relative to the particles of the catalyst, is fast enough so that the catalyst behaves like a fluid, with particles circulating throughout the bed or even being carried out of the bed with the products. Ebullating or expanded beds are very similar to fluidized beds, except that the relative rate of flow of two phase fluids (e.g., liquid and gas) is regulated to expand the catalyst bed in random motion between 110% and 140% of the height of the catalyst in a "slumped" or packed state. The typical ebullating bed reactor will have a mass of solid particles whose gross volume in the reaction vessel is at least 10 percent larger when feed is flowing through it, as compared to the stationary mass with no feed flowing through it. Although the particles in the bed do not necessarily circulate as if they were fluids, they are separated from one another and go through random motion.

Several advantages ensue from use of a moving bed reactor. By establishing and maintaining appropriate gas and liquid velocities in packed bed type reactors, just below the threshold of inertia that would cause the catalyst bed to fluidize and/or "channel" and/or lift the catalyst into random motion, the uniform catalyst characteristics described above will allow the catalyst to migrate downward through the reactors in a predictable plugflow manner, as catalyst batches are withdrawn from the reactor bottom. And further, by maintaining plug flow catalyst movement downward within the reactors (e.g. reactor 11), the catalyst within the reactors can be maintained in layers having differing activity levels and reaction rates. The number of catalyst layers depend on the frequency of catalyst addition and withdrawal, and the amount added and withdrawn in any given period of time. Typically, however, the number of different aged catalyst layers within the reactor (e.g. reactor 11) will be in the range from 10 to 60.

Intermittent or continuous catalyst additions and withdrawal may be used. Catalyst replacement rates can range from several percent of the charge per day to several percent of the charge per week, depending on the reactor size, catalyst metals loading capacity, feed rate, and feed composition and processing objectives. Fresh catalyst is introduced into the downstream end of the catalyst bed (e.g. catalyst bed 10), and a corresponding volume of deactivated catalyst is removed from the upstream end of the catalyst bed, at a rate which is sufficient to maintain the actual overall average level of catalytic upgrading activity of the bed as a whole at or above the selected minimum average activity level. By "upstream" end of the catalyst bed (e.g. catalyst bed 10), as used herein, is meant the end of the moving bed into which the heavy hydrocarbonaceous feed is introduced. By "downstream" end of the catalyst bed is meant the end of the bed from which the process effluent is recovered. In a normal gravity flow system, the catalyst is added and effluent removed at the top of the vessel (the downstream end). Spent catalyst is withdrawn and feed introduced at the bottom (the upstream end).

In a particularly important application of the present invention, catalyst is continuously added at the top of the reactor (e.g. reactor 11) to the slowly moving bed (e.g. bed 10), and spent (and deactivated catalyst) catalyst is continuously withdrawn from bottom of the slowly moving bed. The deactivated catalyst is removed from the reactor (e.g. reactor 11) after it has been deactivated to a substantially lower level of activity than an acceptable minimum average level of activity of the overall catalyst bed. This allows more efficient and complete use of the catalyst activity, e.g. its metals capacity, for such feed upgrading functions as demetallation. As previously indicated, spent (and deactivated) catalyst is withdrawn from the bottom of a reactor in a hydrocarbon liquid. One of the features of the present invention is that the hydrocarbon liquid that is withdrawing and transporting catalyst is the liquid hydrocarbon component LH which is intended to flow upwardly through the bed of catalyst but has not. Thus, one of the features of the present invention is that the hydrocarbon liquid for transporting spent (and deactivated) catalyst is an unconverted liquid hydrocarbon component LH or a partially converted liquid hydrocarbon component LH or a mixture of both; and the transporting hydrocarbon liquid (i.e. the liquid hydrocarbon component LH) has not passed entirely upwardly through the catalyst bed.

The product from the method of the present invention exits a reactor (e.g. reactor vessel 11) and is normally subjected to further conventional refinery processing. All or part of the product can be passed to a conventional, fixed bed upgrading operation, such as a hydrodesulfurization operation. Part of the product stream can be recycled, either for further catalytic treatment or as a diluent. Treatment of heavy feeds by catalytic demetallation according to the present process followed by fixed bed desulfurization is particularly effective, but all or part of a demetallized product from the countercurrent demetallation reaction zone can also be processed in a countercurrent moving bed desulfurization reaction zone.

The present preferred embodiments of the present invention are applicable to hydroconversion reaction zones for hydrocracking, hydrodemetallization, hydrotreating, hydrodesulfurization, hydrodenitrification, hydrofinishing and the like, all of which catalytically upgrade a heavy hydrocarbonaceous oil that represents the liquid hydrocarbon stream or liquid hydrocarbon feed stream (i.e. the liquid hydrocarbon component LH). By "heavy" liquid hydrocarbon stream, as used herein and as previously indicated, is meant liquid hydrocarbon stream at least 50 volume percent of which boils above about 204° C. and which preferably contains a substantial fraction boiling above about 343° C. and particularly preferably above about 510° C. Preferred liquid hydrocarbon streams are residual fractions and synthetic crudes. They can be derived from crude petroleum, from coal, from oil shale, from tar sand bitumen, from heavy tar oils, and from other synthetic sources. The present invention is advantageously employed to refine highly refractory and contaminated liquid hydrocarbon streams. The liquid hydrocarbon stream may be substantially free from finely divided solids such as shale fines, sand or the like. Alternatively, the liquid hydrocarbon stream may contain a substantial concentration (e.g. about 1 weight percent or more) of finely divided solids. As previously indicated, the liquid hydrocarbon stream (i.e. the liquid hydrocarbon component LH) is preferably premixed with any type of hydrogen-containing gas (i.e. the liquid hydrocarbon component HG) which is preferably hydrogen, before being introduced into the reactor vessel 11 as a single stream or hydrocarbon stream. The mixing ratios of the liquid hydrocarbon stream to the hydrocarbon containing gas may be any suitable ratio, well known to those artisans possessing the ordinary skill in the art.

Typically, a heavy hydrocarbonaceous oil employed as a hydrocarbon feed stream in the present invention contains undesirable metals. Undesirable metals which are often present in hydrocarbonaceous feeds notably include nickel, vanadium, arsenic, and iron. These metals deactivate conventional, fixed bed catalysts (such as fixed bed hydroprocessing catalysts) and also rapidly and irreversibly deactivate catalysts when high metals level feed are charged directly to conventional units. These metals are often present as organo-metallic compounds. Thus, the use of the terminology "iron, nickel, arsenic or vanadium compounds" means, those metals in any state in which they may be present in the hydrocarbon feed stream in the process of the present invention, either as metal particles, inorganic metal compounds, or an organo-metallic compounds. Where amounts of metals are referred to herein, the amounts are given by weight based on the metal itself For maximum efficiency in such a countercurrent demetallation process, the hydrocarbon feed stream should have levels of undesirable metals greater than about 150 ppm by weight of the hydrocarbon feed stream, preferably greater than about 200 ppm by weight of the hydrocarbon feed stream, and more preferably greater than about 400 ppm by weight. Although nickel, vanadium, arsenic, and iron are the usual metal contaminants, other undesired metals, such as sodium and calcium, may also contribute to the metals content of the hydrocarbon feed stream for purposes of catalytic demetallation upgrading processing.

Catalytic upgrading conditions (e.g. catalytic desulfurization conditions, catalytic hydrogenation conditions such as designed for asphaltenes saturation, catalytic denitrification conditions and catalytic hydrocracking conditions, etc.) employed in the hydroconversions reaction zones within the reactor vessel 11 for preferred embodiments of the present invention all include a reaction temperature generally in the range of from about 230° C. to about 480° C., a pressure generally in the range of from about 30 to about 300 atmospheres, a hydrogen rate ranging from about 1000 to about 10,000 standard cubic feet per barrel of feed, and a liquid hourly space velocity (LHSV) in the range of from about 0.20 h-1 to about 10 h-1. For feed demetallation upgrading, the temperatures and pressures within the reaction zone can be those typical for conventional demetallation processing. The pressure is typically above about 500 psig (514.7 psia; 35.5 bar). The temperature is typically greater than about 315° C., and preferably above 371° C. Generally, the higher the temperature, the faster the metals are removed; but the higher the temperature, the less efficiently the metals loading capacity of the demetallation catalyst is used. While demetallation reaction can be conducted in the absence of added hydrogen, hydrogen is generally used and therefore requires full and equal distribution into the moving bed along with any gases evolving from the feed.

In carrying out a process of the preferred embodiments of the present invention, a minimum average level of catalytic feed upgrading activity for the countercurrently moving catalyst bed (e.g. catalyst bed 10) as a whole is selected for the particular catalytic upgrading reaction. For a moving bed (e.g. catalyst bed 10) in a demetallation reaction system, for example, the minimum average upgrading activity level for the catalyst bed is one which removes the necessary amount of metals from the hydrocarbon feed stream when it passes through the moving bed at demetallation conditions. Similarly, for a desulfurization reaction system, the moving catalyst bed (e.g. catalyst bed 10) removes the necessary amount of sulfur from the hydrocarbon feed stream when it passes through the moving bed at desulfurization conditions. Thus, as will be apparent to those skilled artisans, the minimum average upgrading activity level for a particular reaction system will depend on the desired degree of a contaminant, such as metals, sulfur, nitrogen, asphaltenes, etc., which the refiner desires to remove from the heavy oil feed. The degree of demetallation or desulfirization (or etc.) will typically be set by economics and the downstream processing that the heavy feed will undergo. Further, according to preferred embodiments of the present invention, the actual average level of catalytic upgrading activity for the catalyst bed (e.g. catalyst bed 10) as a whole is measured. Measurement of the actual average level of upgrading is made by determining the extent to which the hydrocarbon feed stream is being upgraded in the countercurrent moving bed system. For example, when upgrading involves demetallation, demetallation activity is measured by a determination of the residual concentration of metals remaining in the liquid effluent stream from the moving bed system. When upgrading involves desulfurization, desulfurization activity is, analogously, measured by a determination of the residual concentration of sulfur remaining in the liquid effluent from the reaction system. Overall catalyst bed upgrading activity for other upgrading reactions is measured in a similar manner by determining the residual amount of the containment which is to be removed by the process. In the present preferred embodiments, the rate at which catalyst is removed from the reaction zone, and the rate of catalyst replacement to the reaction zone, is established by a number of economic and operating factors, which include maintaining a desired average level of catalytic upgrading activity.

Figure 14:
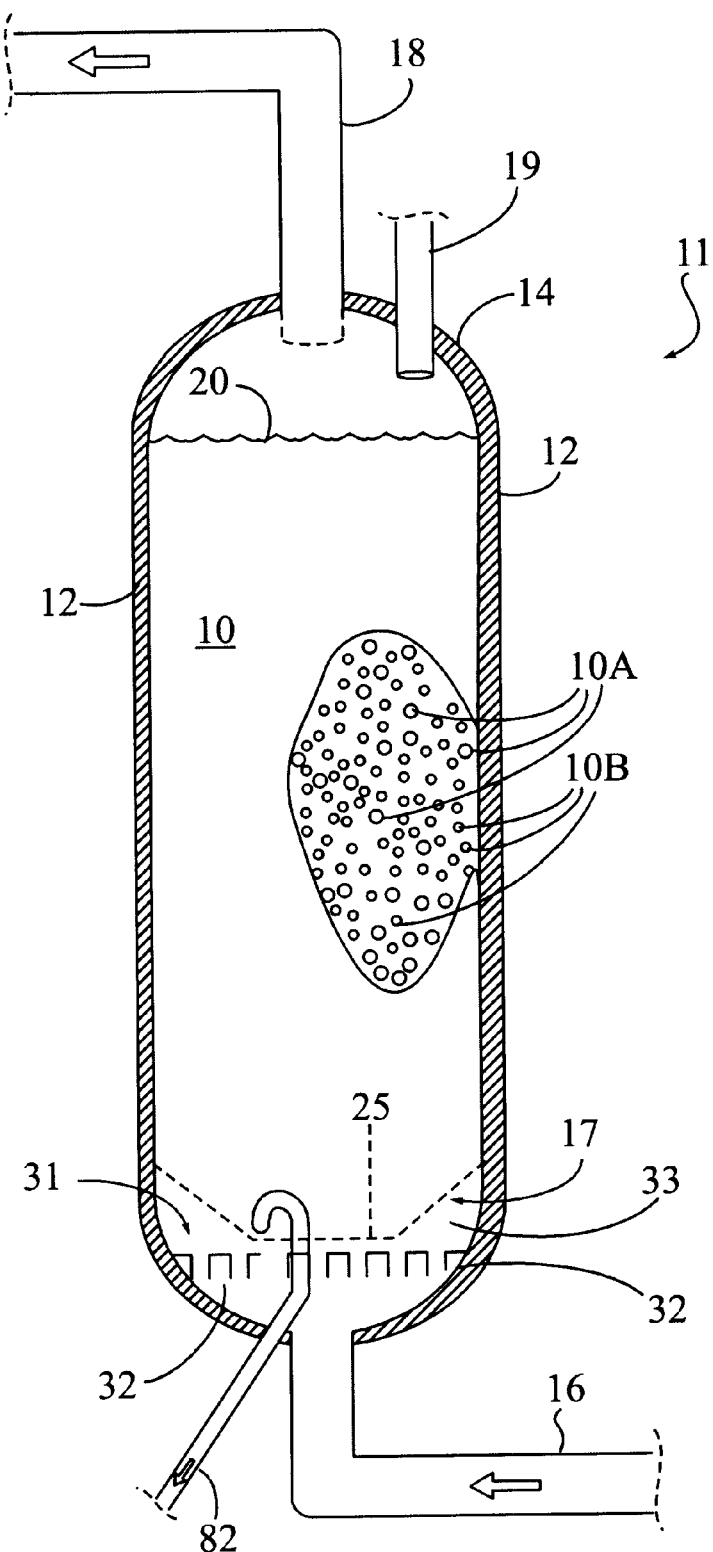
FIG. 14 is a schematic diagram of another embodiment of the present invention having a moving-bed reactor containing a mixture of two distinct catalyst types in a single hydroconversion reaction zone with each catalyst having a different density and a different function.

Referring in detail now to FIGS. 14–17 for another embodiment of the present invention and wherein similar parts of the present invention depicted in FIGS. 14–17 are identified by like reference numerals that depict the same similar parts of the invention depicted in FIGS. 1–13, there is seen in FIG. 14 the moving catalyst bed 10 containing at least two catalysts 10A and 10B, each designed for a different function (e.g. HDM and HDN) and each having a different density, and optionally a different size, so that one type (i.e. 10A or 10B) may be removed from the reactor vessel 11 faster than the other type. Thus, more than one reactor function (e.g. not just HDM) is occurring in the single on-stream reactor vessel 11 with each reactor function occurring at a different rate. The desired residence time for catalyst 10A and catalyst 10B is different. For example, and assuming that catalyst 10A is a denitrification catalyst with a high-activity and catalyst 10B is a demetallation catalyst with a low-activity, the high-activity denitrification catalyst 10A will foul quickly during the hydroprocessing of a hydrocarbon feed stream and should be replaced often, whereas the low-activity demetallation catalyst 10B will remain active and useful longer and would be more cost effective to leave them in the reactor vessel 11 longer to accumulate metals. In order to be able to withdraw the high-activity catalyst 10A faster from the bottom of the reactor vessel 11, the high-activity catalyst 10A is to migrate towards the bottom of the reactor vessel 11 faster than the low-activity catalyst 10B. This is accomplished in one embodiment of the present invention by formulating and/or providing each of the catalyst particles of the catalyst 10A with a higher density than each of the catalyst particles of the catalyst 10B.

Figure 15:
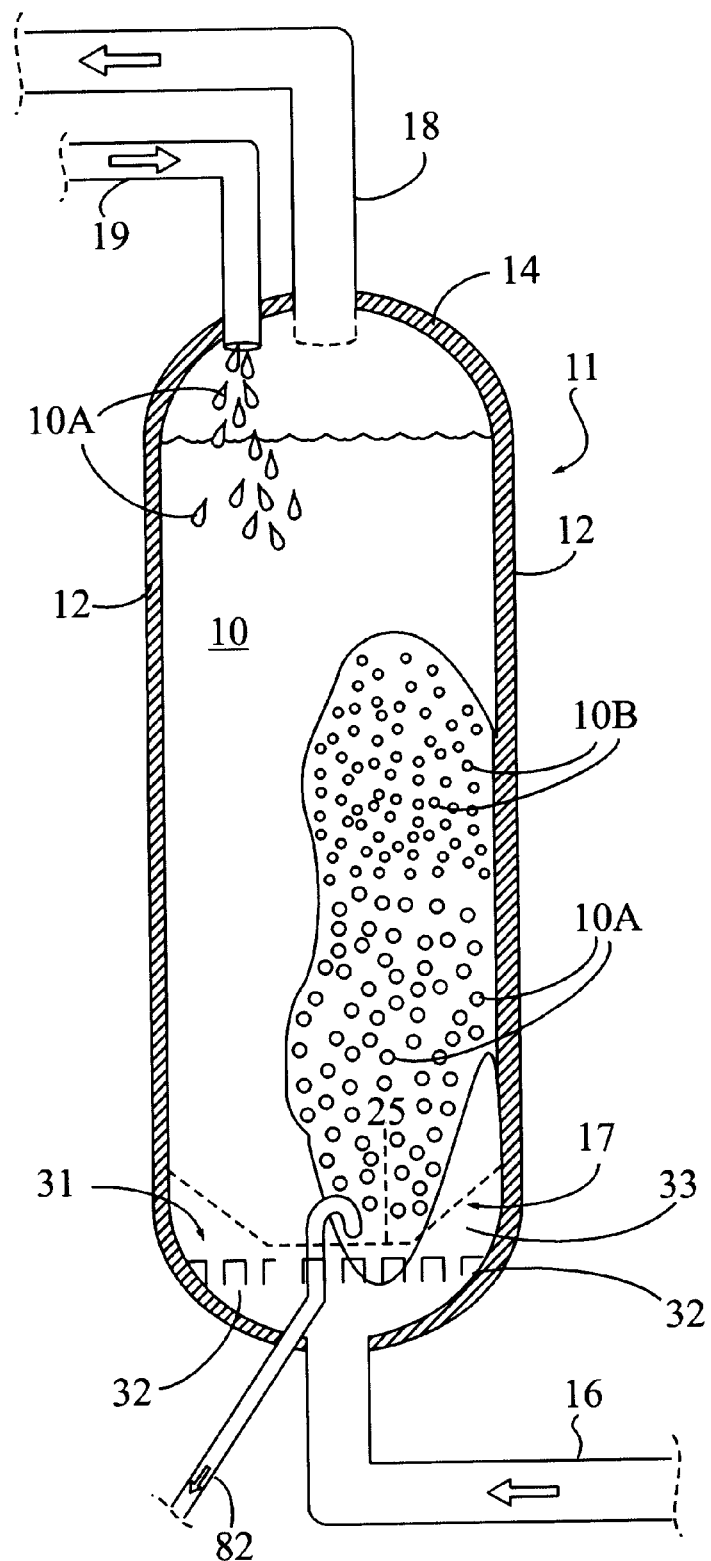
FIG. 15 is schematic diagram of the moving-bed reactor in FIG. 14 after a hydrocarbon feed stream has passed through the catalyst mixture for an initial period of time, allowing the at least partially spent larger or higher density catalyst of the catalyst mixture to gravitate downwardly to be initially removed before the at least partially spent lighter density catalyst of the catalyst mixture, and further allowing the addition of fresh higher density catalyst.

FIG. 15 is a schematic diagram of the moving catalyst bed 10 in FIG. 14 after a hydrocarbon feed stream has passed through the catalyst mixture for an initial period of time, allowing the at least partially spent higher-density catalyst 10A of the catalyst bed 10 to gravitate downwardly for removal before the at least partially spent lighter-density 10B. FIG. 15 also illustrates the adding of fresh higher-density catalyst 10A via pipe 19 as the at least partially spent higher-density catalyst 10A is being removed from the reactor vessel 11 in proximity to the support means 17.

Figure 16:
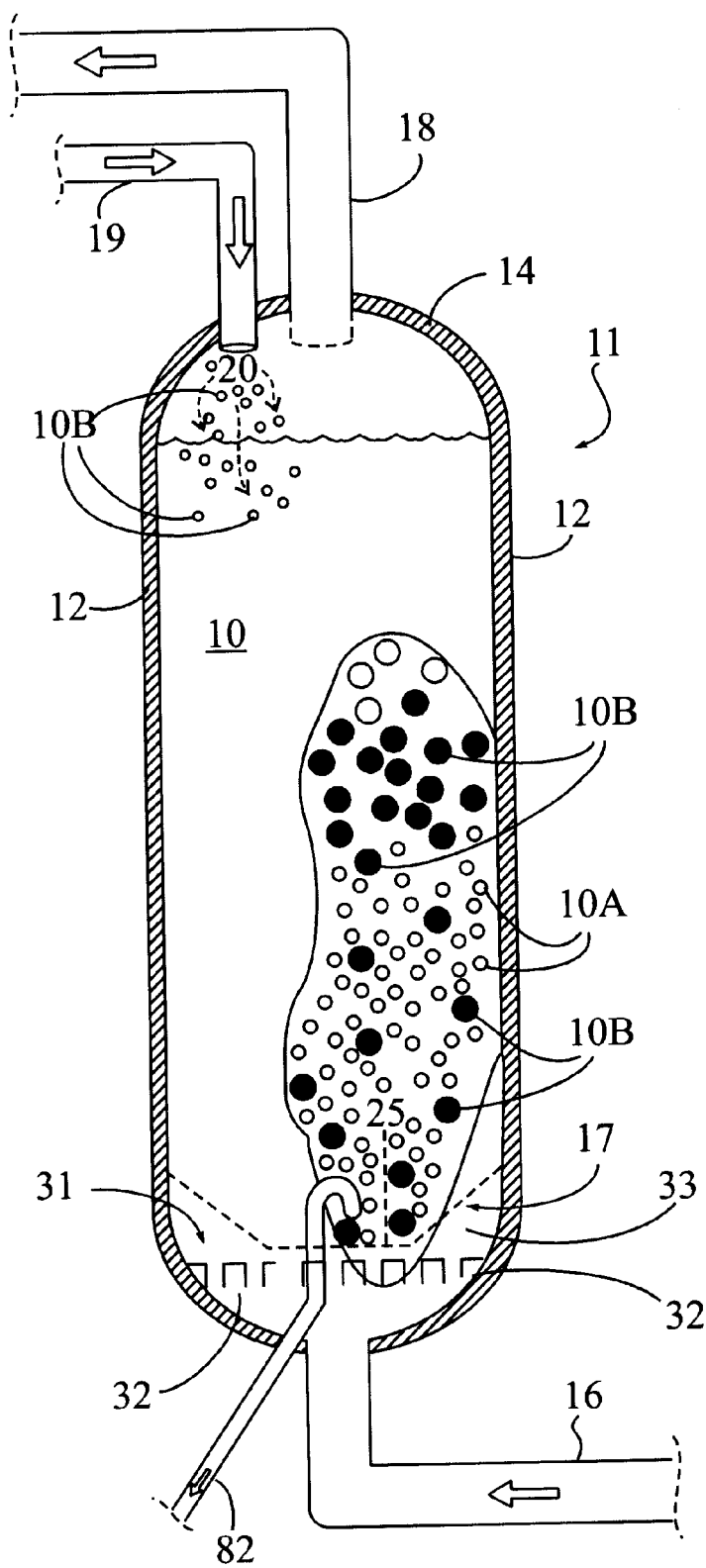
FIG. 16 is a schematic diagram of the moving-bed reactor in FIG. 15 after a hydrocarbon feed stream has passed through the catalyst mixture for an intermediate period of time which is longer than the initial period of time in FIG. 15, allowing the at least partially spent lower density catalyst from the catalyst mixture in FIG. 15 to increase in density and gravitate downwardly to be initially removed before the added higher density catalyst of FIG. 15 that has also become at least partially spent, and further allowing the addition of fresh lighter/lower density catalyst.

FIG. 16 is a schematic diagram of the moving catalyst bed 10 in FIG. 15 after the hydrocarbon feed stream has passed through the catalyst mixture or bed 10 for an intermediate period of time. The intermediate period of time is longer than the initial period of time and allows the oldest and at least partially spent catalyst 10B from the catalyst mixture 10 to accumulate enough metals and coke to increase its density to make it hydrodynamically compatible or equivalent to catalyst 10A in the catalyst bed 10 of FIG. 14 to gravitate or migrate downwardly for removal before removal of the added higher-density catalyst 10A of FIG. 15 that has also become at least partially spent by hydroprocessing for the intermediate period of time. FIG. 16 further illustrates the adding of fresh lower-density catalyst particles 10B, as the at last partially spent lower-density catalyst particles 10B are being removed from the reactor vessel 11.

Figure 17:
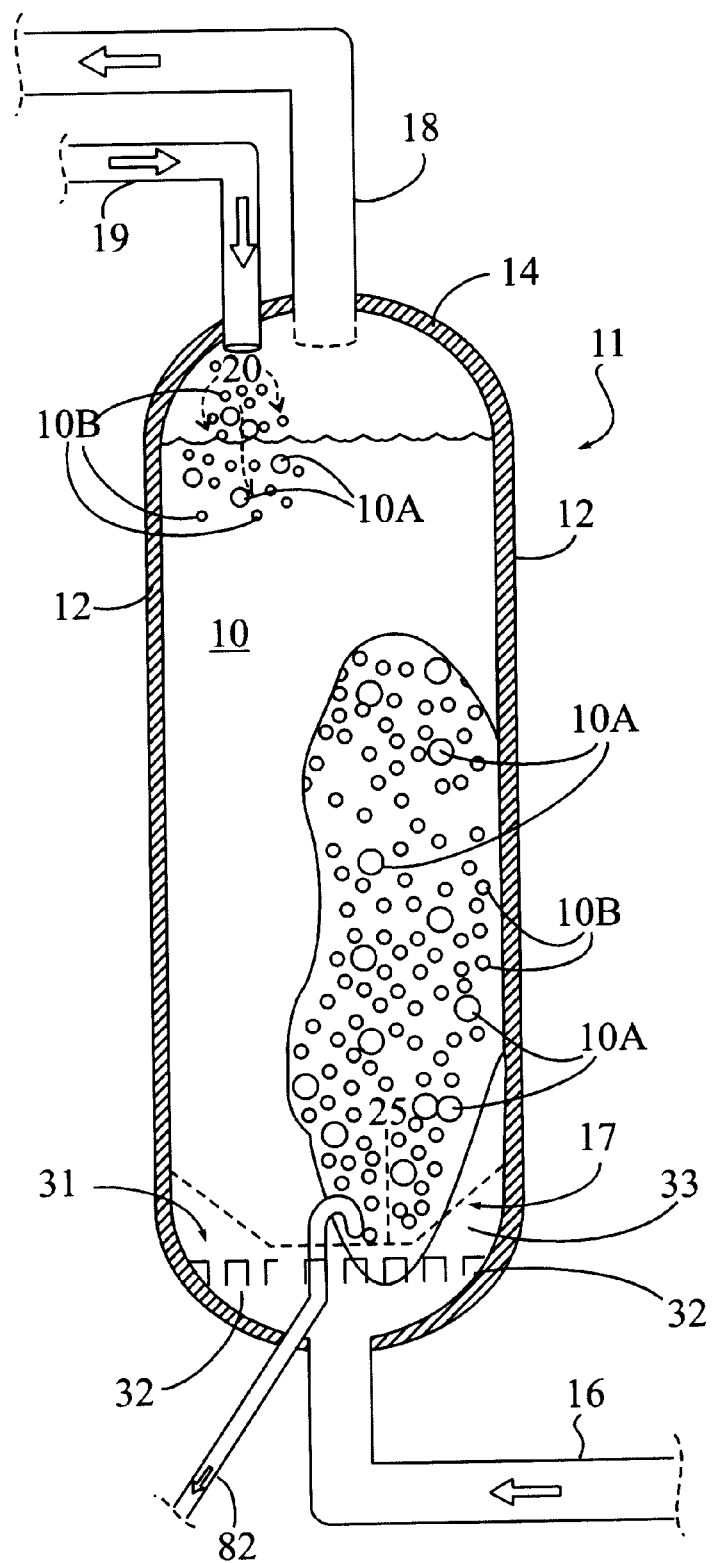
FIG. 17 is a schematic diagram of the moving-bed reactor in FIG. 16 after a hydrocarbon feed stream has passed through the catalyst mixture for a subsequent period of time which is longer than the intermediate period of time in FIG. 16, resulting in a future increase in density thus allowing for removal of a catalyst mixture consisting of previously added at least partially spent higher density catalyst from FIG. 16 and previously added at last partially spent lower density catalyst from FIG. 15, and further allowing for the addition of a catalyst mixture consisting of fresh lower/lighter density catalyst and fresh higher density catalyst.

FIG. 17 is a schematic diagram of the moving catalyst bed 10 in FIG. 16 after a hydrocarbon feed stream has passed through the catalyst bed 10 for a subsequent period of time which is longer than the intermediate period of time in FIG. 16. This allows for removal of a catalyst mixture consisting essentially of previously added at least partially spent higher-density catalyst 10A from FIG. 16 and previously added at least partially spent lower-density catalyst from FIG. 15 and further allowing for the addition of catalyst mixture consisting of fresh lighter-density catalyst 10B and the fresh higher-density catalyst 10A.

Continuing to refer to FIGS. 14 through 17 for operation of this preferred embodiment of this invention including the method for hydroprocessing a hydrocarbon stream, one of the preferred methods includes disposing a plurality of catalyst particles 10A in the reactor vessel 11 and subsequently upflowing thereto a hydrocarbon feed stream. After the hydrocarbon feed stream has upflowed therethrough for a predetermined period of time, a plurality of catalyst particles of catalyst 10B is disposed in the reactor vessel 11. The catalyst particles 10A and the catalyst particles 10B all have a different density; preferably, as previously indicated, a density varying from about 0.6 g/cc to about 2.0 g/cc. As also previously indicated, the difference in density between the catalyst particles 10A and the catalyst particles 10B is more than about ±1.0% by weight. After the catalyst particles 10B have been subsequently disposed within the reactor vessel 11, the hydrocarbon feed stream is continually upflowed through the catalyst mixture consisting of catalyst 10A and catalyst 10B. After another subsequent period of time, a volume of at least partially spent catalyst (e.g. at least partially spent catalyst 10A) from the hydroconversion reaction zone within the reactor vessel 11 is withdrawn; and fresh catalyst (e.g. fresh catalyst 10A) is added into the hydroconversion reaction zone at a volume to substantially replace the volume of the at least partially spent catalyst that was withdrawn.

The catalyst particles of catalyst 10A have certain physical and/or catalytic properties that differ or are distinguishable from the physical and/or catalytic properties of catalyst particles of catalyst 10B. For example, catalyst 10A may possess the properties for desulphurization or denitrification whereas the properties for catalyst 10B may possess physical and/or catalytic properties suitable for demetallization. The fresh catalyst that is added after at least partially spent catalyst is withdrawn may be fresh catalyst particles from catalyst 10A or fresh catalyst particles from catalyst 10B or a mixture of fresh catalyst particles from both catalyst 10A and 10B.

In one embodiment of the present invention, the catalyst particles from catalyst 10A have a mean diameter ranging from about 35 Tyler mesh to about 3 Tyler mesh; and a size distribution such that at least about 90% by weight of the catalyst 10A particles have an aspect ratio less than about 2.0 and a diameter ranging from $R_1$ to $R_2$ wherein: $R_1$ has a value ranging from about 1/64 inch to about 1/4 inch; $R_2$ has a value ranging from about 1/64 inch to about 1/4 inch; a value of a ratio $R_2/R_1$, ranges from a 1.0 to about 1.4, and further wherein; the first catalyst 10A particles have a size distribution such that a maximum of about 2.0% by weight of the catalyst particles 10A have a diameter less than $R_1$ and a maximum of about 0.4% by weight of said first catalyst particles have a diameter less than $R_3$, wherein $R_3$ is less than $R_1$ and the value of the ratio $R_1/R_2$ is about 1.4.

In another embodiment of the present invention the catalyst particles from catalyst 10B have a mean diameter ranging from about 35 Tyler mesh to about 3 Tyler mesh; and a size distribution such that at least about 90% by weight of the catalyst 10B particles have an aspect ratio less than about 2.0 and a diameter ranging from $R_1$ to $R_2$ wherein: $R_1$ has a value ranging from about 1/64 inch to about 1/4 inch; $R_2$ has a value ranging from about 1/64 inch to about 1/4 inch; a value of a ratio $R_2/R_1$, ranges from a 1.0 to about 1.4, and further wherein; the catalyst 10B particles have a size distribution such that a maximum of about 2.0% by weight of the catalyst 10B particles have a diameter less than $R_1$ and a maximum of about 0.4% by weight of the catalyst 10B particles have a diameter less than $R_3$, wherein $R_3$ is less than $R_1$ and the value of the ratio $R_1/R_2$ is about 1.4.

In another embodiment of the present invention as broadly depicted in FIGS. 14 through 17, a method is provided for hydroprocessing the hydrocarbon feed stream which includes the steps of disposing a catalyst mixture into the hydroconversion reaction zone wherein the catalyst mixture has a plurality of catalyst particles from catalyst 10A and a plurality of catalyst particles from catalyst 10B; with each of the catalyst particles having a catalyst base and a catalyst density. As indicated for other preferred embodiments of the present invention, at least 70% by weight of the catalyst particles from catalyst 10A have a catalyst density that differs by more than about ±1.0% by weight, most preferably more than about ±10% by weight from the catalyst density of at least 70% by weight of the catalyst particles from catalyst 10B. After such disposal of the catalyst mixture, the hydrocarbon feed stream is upflowed therethrough for a predetermined period of time. Subsequently a volume of at least partially spent catalyst is withdrawn from the hydroconversion reaction zone and fresh catalyst is added into the same at a volume to substantially replace withdrawn volume of at least partially spent catalyst.

The catalytic base of catalyst 10A and catalyst 10B may differ or be the same. For example, the catalyst base for catalyst 10A may be alumina whereas the catalyst base for catalyst 10B may be silica Alternatively, both catalyst bases may be the same. Again, the catalyst 10A and catalyst 10B preferably have different physical and/or catalytic properties to preform different hydroprocessing functions. For example, catalyst 10A may be for desulfurization whereas catalyst 10B may be for demetallization. The fresh catalyst that is added after at least partially spent catalyst is withdrawn, may be catalyst particles from the catalyst 10A and/or catalyst particles from the catalyst 10B.

As was seen for other embodiments of the present invention, the catalyst particles of catalyst 10A and/or the catalyst particles from catalyst 10B have a mean diameter ranging from about 35 Tyler mesh to about 3 Tyler mesh; and a size distribution such that at least about 90% by weight of the respective catalyst particles have an aspect ratio less than about 2.0 and a diameter ranging from $R_1$ to $R_2$ wherein: $R_1$ has a value ranging from about 1/64 inch to about 1/4 inch; $R_2$ has a value ranging from about 1/64 inch to about 1/4 inch; a value of a ratio $R_2/R_1$, ranges from a 1.0 to about 1.4, and further wherein; the respective catalyst particles have a size distribution such that a maximum of about 2.0% by weight of said catalyst particles have a diameter less than $R_1$ and a maximum of about 0.4% by weight of said catalyst particles have a diameter less than $R_3$, wherein $R_3$ is less than $R_1$ and the value of the ratio $R_1/R_2$ is about 1.4.

In another embodiment for the invention of FIGS. 14 through 17, there is provided a catalyst (i.e. a catalyst mixture) for hydroprocessing a hydrocarbon feed stream that is upflowing through a hydroconversion reaction zone having a substantially packed bed of the catalyst comprising a plurality of first catalyst particles (e.g. catalyst 10A) having a first catalyst density and a mean diameter ranging from about 35 Tyler mesh to about 3 Tyler mesh; and a size distribution such that at least about 90% by weight of the first catalyst particles have an aspect ratio of less than about 2.0 and a diameter ranging from $R_1$ to $R_2$, wherein: $R_1$ has a value ranging from about 1/64 inch to about 1/4 inch; $R_2$ has a value ranging from about 1/64 inch to about 1/4 inch; a value of a ratio $R_2/R_1$ ranges from about 1.0 to about 1.4, wherein: said first catalyst particles have a size distribution such that a maximum of about 2.0% by weight of said first catalyst particles have a diameter less than $R_1$ and a maximum of about 0.4% by weight of said first particles have a diameter less than $R_3$, wherein $R_3$ is less than $R_1$ and the value of the ratio $R_1/R_3$ is about 1.4; and further comprising a plurality of second catalyst particles (e.g. catalyst 10B) having a second catalyst density differing from said first catalyst density.

Thus by the practice of the invention of FIGS. 14 through 17, the mixture of catalyst 10A and catalyst 10B may be employed in any hydrogenation process. The mixture of catalyst 10A and catalyst 10B is preferably for producing a plug-substantially packed bed of hydroprocessing catalyst during hydroprocessing by contacting a substantially packed bed of hydroprocessing catalyst (i.e. catalyst 10 and catalyst 10B) with enough flowing hydrocarbon feed stream. More specifically, when the catalytic particulates of catalyst 10A and catalyst 10B are disposed in the hydrocarbon reaction zone, a substantially packed bed of hydroprocessing catalyst is produced; and when a hydrocarbon feed stream flows upwardly through the substantially packed bed of hydroprocessing catalyst, plug-flowing commences when a volume of catalytic particulates is withdrawn from the bottom of the hydrocarbon reaction zone. Therefore and briefly recapitulating with respect to the embodiment of the invention in FIGS. 14 through 17, if two or more catalyst 10A and 10B of different densities (and optionally of the same size) are loaded into the moving bed reactor vessel 11, the lighter catalyst (e.g. catalyst 10B) will tend to stay nearer the top of the reactor vessel 11, even if the catalyst bed 10 is not a settled or fixed bed. As the lighter catalyst (e.g. catalyst 10B) picks-up and accumulates coke and metals, the density will eventually increase enough that it will sink to the bottom of the reactor where it is withdrawn. The lighter catalyst (e.g. catalyst 10B) will therefore stay in the reactor vessel 11 over a longer period of time than the heavier catalyst (e.g. catalyst 10A) to maximize its working life and usefulness, without premature withdrawal from the reactor vessel 11 where they would still be usefulness and activity in the lighter catalyst (e.g. catalyst 10B). The residence time is controlled by controlling the initial density difference between the two or more catalyst 10A and 10B, and knowing how rapidly the density increases over time; all as would be readily apparent to those artisans possessing the ordinary skill in the art. Furthermore, as wold be apparent to those skilled in the art, the residence time of the two or more catalyst 10A and 10B could be controlled by using two different respective sized catalyst spheres of the same density for the shape of the respective catalyst particles for catalyst 10A and catalyst 10B, with the smallest sphere possessing a higher surface to volume ratio typically "floating" or vibrating to the top, but sinking as its density increases. This would be a less preferred embodiment of the present invention because the small spheres would initially sink if the flow of hydrocarbon feed stream is well below the fluidization velocity for the smaller spheres. Fluidization forces have the ability to segregate the catalyst of the same density if their size and/or shape are significantly different.

The catalysts 10A and 10B, with respect to each other, would consist of catalyst particles of different catalytic characteristics, such as different physical and/or catalytic properties. Considering the range of hydroconversion reaction capabilities which each catalyst 10A and 10B could possess, one skilled in the art will appreciate the variety of catalysts having a variety of physical properties and elemental compositions, which could be used for catalyst 10A and 10B. It is within the spirit and scope of the present invention to encompass hydroconversion reaction systems employing catalysts possessing such shape and density which vary widely from system to system. Each of the catalyst 10A and 10B within the moving catalyst bed 10 would typically have a particular hydroconversion reaction (e.g. hydrometallation, hydrodenitrification, hydrodesulfurization; etc.) capability that differs from the particular hydroconversion reaction capability of the other catalyst. Thus, by way of example only, the catalyst particles 10B moving catalyst bed 10 could possess hydrodemetallation capabilities, where as the catalyst particles 10A moving catalyst bed 10 could posses hydrodenitrification and/or hydrosulfurization and/or any hydrotreating capabilities. A broad and general description of any suitable catalyst for any of the two or more bed moving catalysts 10A and 10B is described below under the subtitle "THE CATALYST", especially for a preferred embodiment of the present invention where each of the two or more catalysts 10A and 10B in the moving catalyst bed 10 is "plug-flowing" catalysts 10A and 10B in a "plug-flowing" catalyst bed 10 and possessing different catalytic capabilities (i.e. different physical and/or catalytic and/or elemental properties).

As previously indicated, the catalyst particles (e.g. catalyst 10A and 10B) charged to the moving bed 10 is a catalyst, precatalyst or catalyst precursor, preferably a catalyst which already contains all of a portion of the desired hydrogenation-dehydrogenation or metal components. The catalyst particles 10A and 10B are thus generally and preferably preformed catalyst, or catalyst which are comprised of metals in catalytic amounts composited with an inorganic oxide support, preferably alumina However, the spirit and scope of the present invention includes that an a support per se, or a support which contains relatively small amounts of a catalytic metal, or metals, can also be added to the catalyst bed 10 and a catalyst formed in situ from catalytic metals contained within the feed as the reaction proceeds. Nickel, a common contaminating metal found in heavy crudes and residua, is a known catalytic metal, and it can be added to such support, or support which already contains only a small amount of the same or a different catalytic metal, or metals, to form the catalyst in situ during reaction. Nickel may thus be deposited within the relatively large pores of the catalyst solids to provide the required hydrogenation-dehydrogenation function, alone or in combination with another previously incorporated metal, or metals.

At least one of the catalyst particles (i.e. 10A and/or 10B) for the catalyst mixture of this invention is or are characterized as catalysts which comprise catalytically active amounts of a hydrogenation component which includes a Group VIB or Group VIII metal (especially a Group VIII non-noble metal), or both (Periodic Table of Elements, E. H. Sargent and Co., Copyright 1962 Dyna-slide Co.), particularly molybdenum or tungsten of Group VIB, and colbalt or nickel of Group VIM, and preferably a Group VIB and Group VIII metal in admixture one metal with the other, or with other metals, or both, particularly Group IVA metals, composited with a refractory inorganic support, notably a porous inorganic oxide support, particularly alumina, or more particularly gamma alumina.

The metals of the at least one of the catalyst (i.e. 10A and/or 10B) generally exist as oxides, sulfides, or reduced forms of the metal or as mixtures of these and other forms. Suitably, the catalyst composition comprises from about 5 to about 50 percent, preferably from about 15 to about 25 percent (as the oxide) of the Group VIB metal, and from about 1 to about 12 percent, preferably from about 4 to about 8 percent (as the oxide) of the Group VIII metal, based on the total weight (dry basis) of the composition. The preferred active metallic components, and forms thereof, comprise an oxide or sulfide of molybdenum and tungsten of Group VIB, an oxide or sulfide of nickel or cobalt of Group VIII, preferably a mixture of one of said Group VIB, an oxide or sulfide of nickel or cobalt of Group VI, preferably a mixture of one of said Group VIB and one of said Group VIII metals, admixed one with the other and inclusive of third metal components of Groups VIB, VIII and other metals, particularly Group IVA metals. The preferred catalyst is constituted of an admixture of cobalt and molybdenum, and in some cases nickel and molybdenum. Other Group VIB and VIII metals include, for example, chromium, platinum, palladium, iridium, osmium, ruthenium, rhodium, and the like. The inorganic oxide supports for catalyst 10A and/or 10B suitably comprise alumina, silica, zirconia, magnesia, boria, phosphate, titania, ceria, thoria, and the like; more preferably alumina and silica. The catalyst support or base in catalyst 10A may differ from the catalyst support or base in catalyst 10B. The catalyst composition can be in the form of beads, aggregates of various particle sizes, extrudates, tablets or pellets, depending upon the type of process and conditions to which the catalyst is to be exposed.

Particularly preferred catalysts for catalyst 10A and/or 10B are composites of nickel or cobalt oxide with molybdenum, used in the following approximate proportions: from about 1 to about 12 weight percent, preferably from about 4 to about 8 weight percent of nickel or cobalt oxides; and from about 5 to about 50 weight percent, preferably from about 15 to about 25 weight percent of molybdenum oxide on a suitable support such as alumina The catalyst is sulfided to form the most active species.

The Group VIB and Group VIII metal components, admixed one component with the other or with a third or greater number of metal components, can be composited or intimately associated with the porous inorganic oxide support or carrier by various techniques known to the art, such as by impregnation of a support with the metals, ion exchange, coprecipitation of the metals with the alumina in the sol or gel form, and the like. For example, a preformed alumina support can be impregnated by an "incipient wetness" technique, or technique wherein a metal, or metals, is contained in a solution in measured amount and the entire solution is absorbed into the support which is then dried, calcined, etc., to form the catalyst. Also, for example, the catalyst composite can be formed from a cogel by adding together suitable reagents such as salts of the Group VIB or Group VIII metals, or mixtures of these and other metals, and ammonium hydroxide or ammonium carbonate, and a salt of aluminum such as aluminum chloride or aluminum sulfate to form aluminum hydroxide. The aluminum hydroxide containing the salts of the Groups VIB or Group VIII metals, or both, and additional metals if desired can then be heated, dried, formed into pellets, or extruded, and then calcined in nitrogen or other generally nonreactive or inert atmosphere. Catalyst formed from cogels typically do not possess pore size distributions as uniform as these formed by impregnation methods.

The more preferred catalyst (i.e. catalyst particles 10A and/or 10B) of this invention is described below under the subtitle "THE CATALYST" and further comprise a metal, or metals, of Group IVA, or compounds thereof The catalyst may thus comprise germanium, tin, or lead, or admixture of such metals with each other or with other metals, or both, in combination with the Group VIB or Group VIII metals, or admixture thereof The Group IVA metals act as promoters in enhancing the rate of demetallization of a feed. Of the Group IVA metals, germanium is particularly preferred. Suitably, the Group IVA metals comprises from about 0.01 to about 10 percent, preferably from about 2.0 to about 5 percent of the catalyst, based on the total weight (dry basis) of the composition. The Group IVA metals are typically incorporated within the catalyst by impregnation.

The catalyst, catalyst precursor, or precatalyst also include a combination of properties comprising at least about 50 percent, preferably at least about 75 percent, of its total pore volume of absolute diameter within the range of about 100 A (Angstrom units) to about 300 A, preferably from about 200 A to about 300 A, and less than about 20 percent, preferably less than 10 percent of its total pore volume of absolute diameter within the range of 0 to 100 A, a surface area ranging at least about 200 m²/g to about 600 m²/g, and preferably at least about 250 m²/g to about 450 m²/g, and a pore volume ranging from about 0.8 to about 3.0 cc/g, and preferably from about 1.1 to about 1.9 cc/g (B.E.T.).

The density of the at least two catalysts 10A and 10B are different. Preferably, the difference in density between the catalyst particles of 10A and catalyst particles 10B is more than about ±1.0% by weight, more preferably more than about ±5.0% by weight, and most preferably more than about ±10.0% by weight. Preferably at least about 70% by weight of the catalyst (i.e. fresh catalyst) of catalyst 10A and/or catalyst 10B has a particle density ranging from about 0.6 g/cc to about 2.5 g/cc, more preferably from about 0.7 g/cc to about 1.8 g/cc, most preferably from about 0.8 g/cc to about 1.5 g/cc. Thus, by way of example only, if the density of at least about 70% by weight of the catalyst particles (i.e. fresh catalyst) of catalyst 10A is about 0.7 g/cc, then preferably at least about 70% by weight of the catalyst particles (i.e. fresh catalyst) of catalyst 10B is more than about 0.707 g/cc or less than about 0.693 g/cc (i.e. ±1.0% of 0.7 g/cc); and more preferably more than about 0.735 g/cc or less than about 0.665 g/cc (i.e. ±5.0% of 0.7 g/cc) and most preferably more than about 0.77 g/cc or less than about 0.63g/cc (i.e. ±10% of 0.7 g/cc). This same principle would apply if catalyst 10A had a density of about 1.5 g/cc.

In this second example, if the density of at least about 70% by weight of the catalyst particles (i.e. fresh catalyst) of catalyst 10A is about 1.5 g/cc. Then preferably at least about 70% be weight of the catalyst particles (i.e. frest catalyst) of catalyst 10B is more than about 1.515 g/cc or less than about 1.485 g/cc (i.e. ±1% of 1.5 g/cc) and more preferably more than about 1.575 g/cc or less than about 1.425 g/cc (i.e. ±5% of 1.5 g/cc) and most preferably more than about 1.65 g/cc or less than 1.35 g/cc (i.e. ±10% or 1.5 g/cc). This same principle would apply to catalysts of other densities and for catalysts 10A and 10B where the relative difference in average densities far exceeds 10%.

The placement of a given reactant catalyst can be tailored through catalyst density selection, e.g. low, medium or high density catalysts. Higher densities will tend to move toward the bottom of the reactor. The catalyst placement can also be effected by size catalyst selection along or in conjunction with density selection.

The Catalyst

In a preferred embodiment of the invention, each catalyst which is charged to the reactor vessel 11 preferably satisfies the following four main criteria: (i) each catalyst has the appropriate catalytic activity and life for the particular application (e.g. demetallation, denitrification, hydrodesulfurization, etc.); (ii) each catalyst has physical properties which minimize its random motion in the reactor vessel 11; (iii) each catalyst has physical properties which minimize catalyst loss both in the catalyst transfer steps and in the reactor vessel 11; and (iv) each catalyst is sufficiently uniform in size and shape and density to prevent classification by size in normal operation.

Each catalyst in the present invention preferably has the appropriate catalytic activity and life for the specific application (e.g. demetallation, denitrification, hydrodesulfurization, etc.). For example, if the catalyst is to be used for demetallation, it should have sufficient HDM activity and metals loading capacity (i.e. life) to meet the target demetallation without the use of uneconomic amounts of catalyst. The metals loading capacity of the catalyst is preferably greater than about 0.10 grams of metal per cubic centimeter of catalyst bulk volume and is more preferably greater than about 0.20 grams metal per cubic centimeter of catalyst bulk volume. The catalyst properties which most affect catalytic activity and metals loading capability are: pore structure (pore volume and pore size distribution); base material (e.g. alumina versus silica); catalytic metals (amount, distribution, and type (nickel, molybdenum, cobalt, etc.)); surface area; and particle size and shape. If the catalyst is to be used for denitrification and/or desulfirization or any other hydrotreating purposes, the same foregoing principles and criteria would apply.

Each catalyst in the present invention also preferably has physical properties which minimize catalyst lifting into random motion in the upflow type reactor vessel 11. Since one of the benefits of the present invention is the counter-current contacting that is achieved between the reactants and catalyst, it is preferred to maintain plug flow of each catalyst downwards through the entire length of the reactor vessel 11. The catalyst properties which are critical to minimizing or preventing catalyst expansion are: catalyst particle density; particle size; skeletal density; and size uniformity. One of the salient features of the present invention is that the catalyst will not expand into random motion in the reactor vessel 11, but will still move rather easily during flow transportation. Under actual process conditions within the reactor, significantly smaller catalysts could rise to the top while significantly larger catalysts could migrate to the bottom. This will not interfere with optimal plug flow movement of each catalyst type if each is made uniformly. For this reason, size specifications for each catalyst of the present invention are narrower than those for fully packed or fixed bed and ebullated bed catalysts.

The catalyst of the present invention should further have physical properties which minimize catalyst loss in the catalyst transfer steps and in the reactor vessel 11. Breakage or attrition of the catalyst in either the transfer steps or in the reactor vessel 11, can have significant adverse effects on the performance of the reactor system itself and on any downstream equipment or processing unit. The following catalyst properties are critical to catalyst loss: catalyst attrition (minimum attrition is absolutely required); catalyst crush strength (maximum crush strength is required without producing a catalyst which is very brittle and might suffer from excessive attrition); catalyst size and shape (spherical catalyst are preferred since they move more easily and have no rough or sharp edges to break off); and fines content (minimum fines is an absolute requirement to avoid adverse effects in the reactor vessel 11 and downstream equipment).

Each catalyst is sufficiently uniform in size and shape and density to prevent classification by size in normal operation. Generally, narrow specifications are required for the catalyst to prevent classification by size. Specific catalyst size is selected so that it is near the point of being expanded into random motion, but not to the point of expansion into random motion per se or ebullation.

All of the four main criteria for the selection of the catalyst of the present invention are important and are not independent or mutually exclusive of each other. The four main criteria must be balanced against each other to optimize the catalyst for the specific application. For example, to minimize catalyst expansion into random motion we would prefer a large and very dense catalyst. This is contrary to the properties we might want for a residuum demetallation application where we need a small particle with low density. These competing needs must be balanced to ensure minimum catalyst expansion or ebullation while achieving adequate catalytic activity and metals loading capability, minimum attrition and minimum classification by size.

Because there are competing catalyst requirements and because each application is unique, the catalyst for the present invention may be any suitable catalyst that is capable of assisting in the operation of the invention and assisting in accomplishing the desired objects of the invention.

The catalyst of the present invention unexpectedly produces a plug-flowing substantially packed bed (i.e. catalyst bed 10) of hydroprocessing catalyst during hydroprocessing by contacting a substantially packed bed of hydroprocessing catalyst with an hydrocarbon feed stream (i.e. a liquid component and a hydrogen-containing gas component) that is upflowing at a rate controlled in an amount and to an extent sufficient to limit expansion of the substantially packed bed of hydroprocessing catalyst to less than 10% by length beyond a substantially full axial length of the substantially packed bed of hydroprocessing catalyst in a packed bed state. More preferably, the expansion of the substantially packed bed of hydroprocessing catalyst is limited to less than 5%, most preferably less than 2% or even less than 1%, by length beyond a substantially full axial length of the substantially packed bed of hydroprocessing catalyst in a packed bed state. The rate of flow of the hydrocarbon feed stream may be any suitable rate controlled in an amount and to an extent sufficient to limit the expansion of the substantially packed bed of hydroprocessing catalyst, preferably the rate of flow is at a rate so that the superficial velocity of the liquid phase in the catalyst bed ranges from about 0.01 ft/min to about 10.00 ft/min.

The catalyst of the present invention more specifically unexpectedly produces a plug-flowing substantially packed bed of hydroprocessing catalyst when a volume of the hydroprocessing catalyst is withdrawn or transferred under preferably laminar flow conditions from the bottom of the substantially packed bed of hydroprocessing catalyst while, and simultaneously to, the substantially packed bed of hydroprocessing catalyst maximally and optimally occupies at least about 50% by volume, preferably from about 80% by volume to about 98% by volume (i.e. the entire internal and/or inside available volume) of the reactor vessel 11. The substantially packed bed of hydroprocessing catalyst of the present invention maximally and optimally occupies a volume within the reactor vessel 11 that is larger or greater than a volume of a bed of catalyst in an ebullating reactor vessel that has substantially the same entire internal and/or inside available volume as the reactor vessel 11 and wherein the volume of the bed of catalyst in the ebullating reactor vessel is in a "slumped" (or packed) catalyst bed condition or state. Typically, a bed of catalyst in an ebullating reactor vessel in a "slumped" catalyst bed condition occupies approximately up to less than about 75% by volume (maximum) of the entire internal and/or inside available volume of the ebullating reactor vessel. Thus, the substantially packed bed of hydroprocessing catalyst preferably maximally and optimally occupies at least about 75% by volume, preferably from about 80% by volume to about 98% by volume of the entire internal and/or inside available volume of the reactor vessel 11. Most preferably, the substantially packed bed of hydroprocessing catalyst of the present invention maximally and optimally occupies from about 75% by volume to about 95% by volume of the entire internal and/or inside available volume of the reactor vessel 11.

The catalyst of the present invention furthermore specifically unexpectedly produces the plug-flowing substantially packed bed of hydroprocessing catalyst when the volume of the hydroprocessing catalyst is withdrawn or transferred in the hydrocarbon feed stream under preferably laminar flow conditions from a central portion or section of the substantially packed bed of hydroprocessing catalyst and at a lowermost or bottommost section thereof and below the entry points of the plurality of annular mixture zones MZ containing the hydrocarbon feed stream (i.e. a liquid component and a hydrocarbon-containing gas component). As previously indicated, when the volume of the hydroprocessing catalyst of the present invention is withdrawn or transferred to commence plug-flow, it is transferred or withdrawn preferably laminarly in the liquid component of the hydrocarbon feed stream and is removed from above and in proximity to an impervious zone (i.e. imperforate center plate 25) of the bed support means 17 and substantially out of the flow path of the LH-HG mixtures (i.e. LH-HG$_2$, LH-HG$_3$, etc.) emanating out of the mixture zones MZ (i.e. MZ$_2$s, MZ$_3$s, etc.). The particular volume (or amount) of catalyst that is withdrawn at any desired time from the bottom of the substantially packed bed of hydroprocessing catalyst may be any suitable volume or amount which accomplishes the desired objectives of the present invention. Preferably, such as by way of example only, the particular volume or amount of catalyst that is withdrawn at any desired time is a volume or amount ranging from about 0.10% by weight to about 25.00% by weight of the substantially packed bed (i.e. catalyst bed 10). The rate of withdrawal of a particular volume (or amount) of catalyst may also be any suitable volume or amount which accomplishes the desired objectives of the present invention, such as a rate of withdrawal where the flow rate of the catalyst (e.g. the catalyst in the hydrocarbon feed stream) ranges from about 0.1 ft/sec. to about 20 ft/sec., more preferably from about 0.1 ft/sec. to about 10 ft/sec., and at a catalyst concentration ranging from about 0.10 lbs catalyst/lb. catalyst slurry (i.e. weight of hydroprocessing catalyst plus weight of hydrocarbon feed stream) to about 0.80 lbs catalyst/lb. catalyst slurry, more preferably from about 0.15 lbs catalyst/lb. catalyst slurry to about 0.60 lbs catalyst/lb. catalyst slurry. As previously indicated, the withdrawn catalyst may be conveniently replaced by introducing a volume of fresh catalyst through the top of the reactor vessel 11 onto the catalyst bed 10. The replacement or catalyst addition rate may be any suitable replacement or catalyst addition rate which will accomplish the desired objects of the present invention, such as a flow replacement rate of the replacement catalyst (i.e. the replacement catalyst in the hydrocarbon refined stream (e.g. gas oil)) ranging from about 0.1 ft/sec. to about 20 ft/sec., more preferably from about 0.1 ft/sec. to about 10 ft/sec., and at a catalyst replacement concentration ranging from about 0.10 lbs. replacement catalyst/lb. catalyst slurry (i.e. weight of replacement catalyst plus the hydrocarbon refined stream (e.g. gas oil) as the slurrying medium) to about 0.80 lbs replacement catalyst/lb. catalyst slurry, more preferably from about 0.15 lbs catalyst/lb. catalyst slurry to about 0.60 lbs catalyst/lb. catalyst slurry.

In a preferred embodiment of the present invention, the catalyst of the present invention comprises an inorganic support which may include zeolites, inorganic oxides, such as silica, alumina, magnesia, titania and mixtures thereof, or any of the amorphous refractory inorganic oxides of Group II, III or IV elements, or compositions of the inorganic oxides. The inorganic support more preferably comprises a porous carrier material, such as alumina, silica, silica-alumina, or crystalline aluminosilicate. Deposited on and/or in the inorganic support or porous carrier material is one or more metals or compounds of metals, such as oxides, where the metals are selected from the groups Ib, Vb, VIb, VIIb, and VIII of the Periodic System. Typical examples of these metals are iron, cobalt, nickel, tungsten, molybdenum, chromium, vanadium, copper, palladium, and platinum as well as combinations thereof Preference is given to molybdenum, tungsten, nickel, and cobalt, and combinations thereof Suitable examples of catalyst of the preferred type comprise nickel-tungsten, nickel-molybdenum, cobalt-molybdenum or nickel-cobalt-molybdenum deposited on and/or in a porous inorganic oxide selected from the group consisting of silica, alumina, magnesia, titania, zirconia, thoria, boria or hafnia or compositions of the inorganic oxides, such as silica-alumina, silica-magnesia, alumina-magnesia and the like.

The catalyst of the present invention may further comprise additives which alter the activity and/or metals (and/or nitrogen and/or sulfur and/or any other elements) loading characteristics of the catalyst, such as but not limited to phosphorus and clays (including pillared clays). Such additives may be present in any suitable quantities, depending on the particular application for the hydroconversion process including the applied catalyst. Typically, such additives would comprise essentially from about zero (0)% by weight to about 10.0% by weight, calculated on the weight of the total catalyst (i.e. inorganic oxide support plus metal oxides). Although the metal components (i.e. cobalt, molybdenum, etc.) may be present in any suitable amount, the catalyst of the present invention preferably comprises from about 0.1 to about 60 percent by weight of metal component(s) calculated on the weight of the total catalyst (i.e. inorganic oxide support plus metal oxides) or and more preferably of from about 0.2 to about 40 percent by weight of the total catalyst, and most preferably from about 0.5 to about 30 percent by weight of the total catalyst. The metals of Group VIII are generally applied in a minor or lesser quantity ranging from about 0.1 to about 30 percent by weight, more preferably from about 0.1 to about 10 percent by weight; and the metals of Group VIB are generally applied in a major or greater quantity ranging from about 0.5 to about 50 percent by weight, more preferably from about 0.5 to about 30 percent by weight; while as previously mentioned above, the total amount of metal components on the porous inorganic support is preferably up to about 60 percent by weight (more preferably up to about 40 percent by weight) of the total catalyst. The atomic ratio of the Group VIII and Group VIB metals may vary within wide ranges, preferably from about 0.01 to about 15, more preferably from about 0.05 to about 10, and most preferably from about 0.1 to about 5. The atomic ratios would depend on the particular hydroprocessing application for the catalyst and/or on the processing objectives.

The groups in the Periodic System referred to above are from the Periodic Table of the Elements as published in Lange's Handbook of Chemistry (Twelfth Edition) edited by John A. Dean and copyrighted 1979 by McGraw-Hill, Inc., or as published in The Condensed Chemical Dictionary (Tenth Edition) revised by Gessner G. Hawley and copyrighted 1981 by Litton Educational Publishing Inc.

In a more preferred embodiment for the catalyst, the oxidic hydrotreating catalyst or metal oxide component carried by or borne by the inorganic support or porous carrier material is molybdenum oxide ($MoO_3$) or a combination of $MoO_3$ and nickel oxide (NiO) where the $MoO_3$ is present in the greater amount. The porous inorganic support is more preferably alumina. The Mo is present on the catalyst inorganic support (alumina) in an amount ranging from about 0.5 to about 50 percent by weight, preferably from about 0.5 to about 30 percent by weight, most preferably from about 1.0 to about 20 percent by weight, based on the combined weight of the inorganic support and metal oxide(s). When nickel (Ni) is present it will be in amounts ranging up to about 30 percent by weight, preferably from about 0.5 to about 20 percent by weight, more preferably from about 0.5 to about 10 percent by weight, based on the combined weight of the catalyst inorganic support and metal oxide(s). The oxidic hydrotreating catalyst or metal oxide component may be prepared by any suitable technique, such as by depositing aqueous solutions of the metal oxide(s) on the porous inorganic support material, followed by drying and calcining. Catalyst preparative techniques in general are conventional and well known and can include impregnation, mulling, co-precipitation and the like, followed by calcination.

The catalyst has a surface area (such as measured by the B.E.T. method) sufficient to achieve the hydroprocessing objectives of the particular application. Surface area is typically from about 50 sq. meters per gram to about 300 sq. meters per gram, more typically from about 75 sq. meters per gram to about 150 sq. meters per gram.

The catalyst mean crush strength should be a minimum of about 5 lbs. Crush strength may be determined on a statistical sample of catalytic particulates. For example, a fixed number (say 30 catalyst particles) are obtained from a statistical lot comprising a plurality of catalyst particles that are to be employed in the hydrogenation process of the present invention. Each catalyst particle is subsequently disposed between two horizontal and parallel steel plates. A force is then applied to the top steel plate until the disposed catalyst particle breaks. The force applied to break the catalyst particle is the crush strength. The test is repeated for the remaining catalyst particles, and a mean crush strength is obtained. Preferably further, no more than about 35% by wt. of the catalyst particles or catalytic particulates have a mean crush strength of less than about 5 lbs.; more preferably, no more than about 15% by wt. of the catalyst particles or catalytic particulates have a mean crush strength of less than about 5 lbs; and most preferably, no more than about 0% by wt.

The catalyst of the present invention comprises a plurality of catalytic particulates having a uniform size, which is preferably spherical with a mean diameter having a value ranging from about 35 Tyler mesh to about 3 Tyler mesh, more preferably ranging from about 20 Tyler mesh to about 4 Tyler mesh, and most preferably from about 14 Tyler mesh to about 5 Tyler mesh. The Tyler mesh designations referred to herein are from a table entitled "Tyler Standard Screen Scale Sieves" in the 1981 Edition of Handbook 53, published by CE Tyler Combustion Engineering, Inc., 50 Washington St., South Norwalk, Conn. 06856.

Likewise, the preferred catalyst particle has a uniformly smooth and rounded surface. Preferred shapes include, for example, spheres, spheroids, egg-shaped particles and the like. More preferably, the catalyst of the present invention, is a rounded particle having an aspect ratio of less than about 2.0, more preferably equal to or less than about 1.5, most preferably about 1.0. More preferably, the catalyst of the present invention has a size distribution such that at least about 90% by weight (more preferably at least about 95% by weight; most preferably at least about 97% by weight) of the catalytic particulates contained within the catalyst bed 10 have an aspect ratio of less than about 2.0, more preferably less than about 1.5, and most preferably about 1.0. As used herein, "aspect ratio" is a geometric term defined by the value of the maximum projection of a catalyst particle divided by the value of the width of the catalyst particle. The "maximum projection" is the maximum possible catalyst particle projection. This is sometimes called the maximum caliper dimension and is the largest dimension in the maximum cross-section of the catalyst particle. The "width" of a catalyst particle is the catalyst particle projection perpendicular to the maximum projection and is the largest dimension of the catalyst particle perpendicular to the maximum projection.

The catalyst should have a particle size distribution such that the catalyst bed 10 expands under the conditions within the reactor vessel 11 to less than 10% by length (more preferably less than 5% and most preferably less than 1% by length) beyond a substantially full axial length of the substantially packed bed of the hydroprocessing catalyst in a packed bed state. In order to maximize reactor throughput, each type of catalytic particulates has a narrow size distribution. Each catalyst employed in the hydrogenation process of the present invention broadly comprises a size range or size distribution such that at least about 90% by weight, preferably at least about 95% by weight, more preferably, at least about 97% by weight, of the catalytic particulates in the catalyst bed 10 have a diameter ranging from $R_1$ to $R_2$, wherein: (i) $R_1$ has a value ranging from about 1/64 inch (i.e. the approximate opening size of a 35 mesh Tyler screen) to about 1/4 inch (i.e. the approximate opening size of a 3 mesh Tyler screen); (ii) $R_2$ also has a value ranging from about 1/64 inch (i.e. the approximate opening size of a 35 mesh Tyler screen) to about 1/4 inch (i.e. the approximate opening size of a 3 mesh Tyler screen); and (iii) the ratio $R_2/R_1$ has a value greater than or equal to 1 and less than or equal to about 1.4 (or about the square root of 2.0). More preferably, each type of catalytic particulates in the catalyst bed 10 has a diameter ranging from $R_1$ to $R_2$ wherein $R_1$ and $R_2$ each has a value ranging from about 2/64 inch (i.e. the approximate opening size of a 20 mesh Tyler screen) to about 12/64 inch (i.e. the approximate opening size of a 4 mesh Tyler screen), most preferably from about 3/64 inch (i.e. the approximate opening size of a 14 mesh Tyler screen) to about 9/64 inch (i.e. the approximate opening size of a 5 mesh Tyler screen), and wherein the ratio $R_2/R_1$ has a value ranging from about 1.00 to about 1.4 (or about the square root of 2.0).

Each catalyst employed in the hydrogenation process of the present invention also broadly comprises a size range or size distribution such that a maximum of about 2.0% by weight (more preferably a maximum of about 1.0% by weight and most preferably a maximum of about 0.5% by weight or less) of the catalyst particles or catalytic particulates has a diameter less than $R_1$. The value of $R_1$ can be same or different for each type of catalyst in catalyst Bed 10. Each catalyst also has a size range or size distribution such that a maximum of about 0.4% by weight (more preferably a maximum of about 0.2% by weight and most preferably a maximum of about 0.1% by weight or less) of the catalyst particles or catalytic particulates have a diameter less than $R_3$, wherein $R_3$ is less than $R_1$ and the value of the ratio $R_1/R_3$ is about 1.4 (or about the square root of 2.0). The catalyst particles or catalytic particulates of the catalyst preferably have a maximum attrition of about 1.0% by weight (more preferably a maximum of about 0.5% by weight and most preferably a maximum of about 0.25% by weight or less) of the catalyst particles or catalytic particulates through a diameter (i.e., a Tyler screen opening) having a value of $R_1$, and a further maximum attrition of about 0.4% by weight (more preferably a maximum attrition of about 0.2% by weight and most preferably a maximum attrition of about 0.1% by weight or less) of the catalyst particles or catalytic particulates through a diameter (i.e., again a Tyler screen opening) having a value of $R_3$ wherein $R_3$ again (as stated above) is less than $R_1$ and the value of the ratio of $R_1/R_3$ is about 1.4 (or about the square root of 2.0). [Note that the attrition procedure is specified in ASTM D 4058-87. However, in the standard method, the fines are removed through a 850: (~20 mesh) screen. In the present method, the screen is an opening equal to the minimum catalyst size desired for the particular application, as more specifically defined by the value of $R_1$ and $R_3$.] Thus, by way of example only, for one catalyst with a specified size range of about 10 to about 12 Tyler mesh, one would specify up to about 2.0% by wt. fines (more preferably up to about 1.0% by wt.) MAX through 12 Tyler mesh and up to about 0.4% by wt. (more preferably up to about 0.2% by wt.) MAX through 14 Tyler mesh. Similarly, for a catalyst with a specified size range of about 6 to about 8 Tyler mesh, one would specify up to about 2.0% by wt. fines (more preferably up to about 1.0% by wt. fines) MAX through 8 Tyler mesh and up to about 0.4% by wt. fines (more preferably up about 0.2% by wt. fines) MAX through 10 Tyler mesh. For the catalyst with the specified size range of about 10 to about 12 mesh, one would specify an attrition of up to about 1.0% by wt. (more preferably up to about 0.5% by wt., most preferably up to about 0.25% by wt.) MAX through 12 Tyler mesh and up to about 0.4% by wt., (more preferably up to about 0.2% by wt., most preferably up to about 0.1% by wt.) MAX through 14 Tyler mesh. Similarly further, for catalyst with the specified size range of about 6 to about 8 Tyler mesh, one would specify an attrition of up to about 1.0% by wt. (more preferably up to about 0.5% by wt., most preferably up to about 0.25% by wt.) MAX through 8 Tyler mesh and up to about 0.4% by wt. (more preferably up to about 0.2% by wt., and most preferably up to about 0.1% by wt.) MAX through 10 Tyler mesh.

The specific particle density of the catalyst particles is determined by the requirements of the hydroconversion process. For the present invention it is preferred that each type of catalyst particles have a uniform density. By "uniform density" is meant that the density of at least about 70% by weight, preferably at least about 80% by weight, and more preferably at least about 90% by weight, of the individual catalyst particles do not vary by more than about 10% from the mean density of all catalyst particles; and more preferably the individual catalyst particles do not vary by more than about 5% from the mean density of all of the particles. In a preferred embodiment of the present invention the catalyst (i.e. fresh catalyst) has a particle density ranging from about 0.6 g/cc to about 2.5 g/cc, more preferably from about 0.7 g/cc to about 1.8 g/cc, most preferably from about 0.8 g/cc to about 1.5 g/cc. After the catalyst has at least been partially spent, the particle density would range from about 0.6 g/cc to about 4.0 g/cc, more preferably from about 0.7 g/cc to about 3.0 g/cc and most preferably from about 0.8 g/cc to about 3.0 g/cc. The particle size determination will remain substantially the same as defined above. Fines and attrition may increase during hydroprocessing.

While the catalyst of the present invention may be any catalyst as defined above, we have discovered that the more preferred catalyst for optimally accomplishing the objectives of the present invention comprises in combination the following properties: (i) a porous inorganic oxide support; (ii) one or more catalytic metals and/or additional catalytic additives deposited in and/or on the porous inorganic oxide support; (iii) a crush strength at least about 5 pounds force; (iv) a uniform size ranging from about 6 to about 8 Tyler mesh sizes; (v) a fines content up to about 1.0 percent by weight through 8 Tyler mesh and up to about 0.2 percent by weight through 10 Tyler mesh; (vi) an attrition up to about 0.5 percent by weight through 8 Tyler mesh and up to of about 0.2 percent by weight through 10 Tyler mesh; (vii) a generally uniform spherical shape; and (viii) a uniform density ranging from about 0.7 g/cc to about 3.0 g/cc. We have discovered unexpectedly that the more preferred catalyst having or containing the immediate foregoing combination of properties, unexpectedly produces in an optimal fashion the plug-flowing substantially packed bed (i.e. catalytic bed 11) of hydroprocessing catalyst which is simultaneously expanding to less than 10 percent by length (more preferably less than 1% by length) beyond a substantially full axial length of the substantially packed bed of hydroprocessing catalyst in a packed bed state while (and simultaneously with) the substantially packed bed of hydroprocessing catalyst maximally and optimally occupying from about 50% percent by volume to about 98% percent by volume (i.e. the entire internal and/or inside available volume or reactor volume) of the reactor vessel 11.

The particular type of porous base material or inorganic oxide support, the particular type of catalytic metal, the pore structure, the catalyst surface area and catalyst size, would all depend on the intended specific application (e.g. demetallation, desulfurization, denitrification, etc.) of the catalyst. Generally, the more preferred catalyst comprises a porous inorganic oxide support selected from the group consisting alumina, silica, and mixtures thereof, and has a surface area ranging from about 75 square meters per gram to about 150 square meters per grain. The preferred catalyst comprises catalytic metal(s), present as oxide(s) deposited in and/or on the porous inorganic support. Oxide(s) of the catalytic metal(s), or the metallic oxide component of the preferred catalyst, is selected from the group consisting of molybdenum oxide, cobalt oxide, nickel oxide, tungsten oxide, and mixtures thereof, and comprises from about 0.5 to about 50 percent by weight, more preferably from about 0.5 to about 30 percent by weight, of the total catalyst (i.e. inorganic oxide support plus metal oxide(s)). The more preferred catalyst further comprises a general uniform spherical shape having a mean diameter ranging from about 20 Tyler mesh to about 4 Tyler mesh. While a spherical shaped catalyst is the more preferred catalyst, an extrudate may be employed if it is very strong, say having a crush strength over 5 lbs. of force. The absolute size of the catalyst may vary from application to application, but the more preferred catalyst has the narrow size distribution as previously stated above.

From the foregoing discussion it will be clear to the skilled practitioner that, though each type of catalyst particles of the present process have a uniform size, shape, and density, the chemical and metallurgical nature of the catalyst may change, depending on processing objectives and process conditions selected. For example, a catalyst selected for a demetallation application with minimum hydrocracking desired, could be quite different in nature from a catalyst selected if maximum hydrodesulfurization and/or hydrodenitrification and/or hydrocracking are the processing objectives. The type of catalyst selected in accordance with and having the properties mentioned above, is disposed in any hydroconversion reaction zone. A hydrocarbon feed stream is passed through the catalyst, preferably passed through such as upflow through the catalyst, in order to hydroprocess the hydrocarbon feed stream. More preferably, the catalyst is employed with the various embodiments of the present invention.

EXAMPLES

The following examples are exemplary examples of process runs, conducted in accordance with various method steps of the present invention and employing the apparatus in accordance with various preferred embodiments of the present invention. The following set-forth examples are given by way of illustration only and not by any limitation, and set-forth a best mode of the invention as presently contemplated. All parameters such as concentrations, flow rates, mixing proportions, temperatures, pressure, rates, compounds, etc., submitted in these examples are not to be construed to unduly limit the scope of the invention.

Example I

In a semi-commercial scale residuum conversion pilot plant operating at 100–200 BPD, the catalyst transfer procedure, as described above, was demonstrated more than 50 times. During each transfer, about 2 cubic feet of catalyst was moved into and out of the reactor vessel running continuously at typical residual desulfurization (RDS) conditions. Transfer rates up to 16 cubic feet per hour of catalyst were accomplished through pipes with an inside diameter 8 times larger than the catalyst diameter. Plug flow movement of the catalyst and the absence of bed ebullation were proven using radioactively tagged catalyst particles incorporated in the test bed.

Among the significant features of the invention specifically demonstrated in such runs were that: (1) ball valves, such as those made by the Kaymr and Mogas companies, can be used to isolate the RDS reactor from the catalyst transfer vessels, and to transfer catalyst particles without using solids handling valves, (2) the catalyst bed level and thus ebullation can be adequately monitored using a gamma-ray source and detector, (3) J-tubes (all with upward flow sections substantially shorter than the downward flow paths) will satisfactorily transfer catalyst particles, without local ebullation, by laminar fluid flow, (4) use of fluid feed inlet distributor means with a conical support and concentric annular segment plates prevents ebullation at the base of the catalyst bed and provides adequate radial distribution of gas and liquid, by forming concentric alternate rings of gas and liquid (5) substantial differences were shown where bed ebullation (expansion) occurred with one catalyst as compared to no significant bed ebullation (expansion) with another catalyst using the same size and shape but with a lower density, and (6) transfer of catalyst into, and out of, a bed traveling downwardly by gravity in a reactor vessel while continuously operating a hydroprocessing system to react a gas containing hydrogen and a feed stream of hydrocarbon liquids flowing as a single stream from the bottom of the bed, will permit countercurrent flow without separation during upward passage through and out of the top of the reactor vessel, and (7) as the result of intermittent catalyst discharge, the catalyst bed moves countercurrently down through the reactor in plug-like flow.

Example II

From the foregoing tests in an apparatus under flow conditions described in Example I, the effectiveness of the foregoing mechanical and hydraulic factors were validated for performing hydrotreating processing with hydrocarbon and hydrogen streams counterflowing through a moving bed of catalyst particles, as follows:

In a pilot plant operating at up to 4 BPD hydrocarbon feed and hydrogen at 2200 PSI, catalyst bed expansion measurements were made at commercial-scale flow velocities with beds of catalysts of different sizes, shapes, and densities as indicated in Table I. Each type of catalyst was tested separately. Bed ebullation (expansion) was measured using a gamma-ray source and detector means mounted to detect 10% bed expansion. Table I shows flow velocities required to produce 10% bed expansion with several catalysts at a standard hydrogen recirculation rate of 5000 SCFB. These results confirmed the bed expansion results from the semi-commercial scale plant of Example I.

Table II is a similar set of runs using beds of three of the same catalyst particles as those tested under conditions shown in Table I except that the liquid viscosity, liquid density and pressure of the hydrocarbon feed stream and gas were lower in Table II than Table I to match a different set of commercial operating conditions. From Tables I and II the effect of catalyst particle size, density and shape are clearly indicated for different flow conditions for the liquid and gas components of the feed. The design feed rates for a hydrocarbon treating process were calculated by standard scaling procedures to indicate the values in MBPD (thousands of barrels per day) through a reactor vessel containing a catalyst bed II. 5 feet in diameter.

In general catalyst for commercial use would be selected on the basis of levitation or ebullation at a selected rate which is substantially higher than normal design feed rate, say up to 100% greater. Additionally, these tests indicate that some commercial catalysts will not lift at reasonable design feed rates if the particles have a high degree of uniformity and are sufficiently strong to maintain their integrity during movement into and out of the reactor vessel, without attrition or breakage.

TABLE I

CATALYST BED EXPANSION STUDY TEST RESULTS
2200 PSI Hydrogen and Flush Oil
Liquid Density 51 lb/ft 3 Viscosity 1.1 cp
Gas Density 0.49 lb/ft 3 Viscosity 0.016 cp
Flow rates for 10% Bed Expansion
@ 5000 SCFB $H_2$

| Catalyst | Relative Size | Shape | Skeletal Density | Particle Density | Effective Density In Oil (1) | Liquid Velocity Ft/Min | Gas Velocity Ft/Sec | MBPD in 11.5 Ft. ID Reactor |
|---|---|---|---|---|---|---|---|---|
| A | 1 | Cylinder | 2.69 | 1.05 | 0.55 | 0.46 | 0.11 | 13 |
| B | 1.6 | Quadralobe | 3.55 | 1.03 | 0.56 | 0.60 | 0.14 | 17 |
| C | 2 | Cylinder | 3.61 | 1.60 | 1.05 | 0.46 | 0.11 | 13 |
| D | 3.2 | Sphere | 2.33 | 0.60 | 0.21 | 0.32 | 0.07 | 9 |
| E | 3.2 | Sphere | 3.63 | 0.83 | 0.47 | 1.38 | 0.33 | 40 |
| F | 3.2 | Cylinder | 3.58 | 1.37 | 0.89 | 1.38 | 0.33 | 40 |

(1) Effective Density in Oil = Density of the Particle in Oil with Buoyancy Forces Includes = (Skeletal Density) (vol % Skeleton) + (Oil Density) (vol % Pores) − Oil Density

TABLE II

CATALYST BED EXPANSION STUDY TEST RESULTS
With Hydrogen and Hydrocarbon at 1000 PSI
Liquid Density 48 lb/ft 3 Viscosity 0.56 cp
Gas Density 0.23 lb/ft 3 Viscosity 0.013 cp
Flow rates for 10% Bed Expansion
@ 5000 SCFB $H_2$

| Catalyst | Relative Size | Shape | Skeletal Density | Particle Density | Effective Density In Oil (1) | Liquid Velocity Ft/Min | Gas Velocity Ft/Sec | MBPD in 11.5 Ft. ID Reactor |
|---|---|---|---|---|---|---|---|---|
| C | 2 | Cylinder | 3.61 | 1.60 | | 0.53 | 0.13 | 15 |
| E | 3.2 | Sphere | 3.63 | 0.83 | | 1.38 | 0.33 | 40 |
| F | 3.2 | Cylinder | 3.58 | 1.37 | | 1.50 | 0.50 | 60 |

Example III

In a 4 foot diameter vessel a "cold model" was operated using up to 8000 BPD water and 275 SCFM air. The features of the inlet liquid and gas distributor as well as the hydrogen gas redistribution and quench stages, described above and shown in the drawings were scaled and tested. Flow measurements and underwater photography proved that distribution of the inlet gas and liquid was uniform across the full cross-sectional area of the catalyst support screen in the vessel. Redistribution of the rising gas through the inverted V-shaped sheds was shown to be surprisingly effective even when gas was intentionally maldistributed below the redistributor stages.

Summary of Test Results for Examples I, II and III

Briefly, these test results show that the present invention makes possible substantially continuous flow of uniformly distributed hydrogen and hydrocarbon liquid across a densely packed catalyst bed to fill substantially the entire volume of a reactor vessel by introducing the fluids as alternate annular rings of gas and liquid at a rate insufficient to levitate the bed and with the catalyst selected with a density, shape and size adequate to prevent lifting of the bed at the desired feed rates. (Catalysts are selected by measuring bed expansion in a large pilot plant run with hydrocarbon, hydrogen, and catalyst at the design pressures and flow velocities). At the desired flow rate, such catalyst continually flows in a plug-like manner downwardly through the vessel by introducing fresh catalyst at the top of the bed by laminarly flowing such catalyst in a liquid stream on a periodic or semicontinuous basis. Catalyst is removed by laminarly flowing catalyst particles in a liquid stream out of the bottom of the bed. Intake for such flow is out of direct contact with the stream of gas flowing through the bed and the flow path is substantially constant in cross-sectional area and greater in diameter by several times than the diameter of the catalyst particles.

Example IV

A plurality of catalytic particulates were charged into a reaction zone contained within a reactor, such as reactor vessel 11. The plurality of catalytic particulates formed a catalyst bed (such as catalyst bed 10 in FIGS. 1, 8 and 9). The catalyst bed was supported in the reactor by a truncated conical bed support similar to the support that is generally illustrated as 17 in FIGS. 8, 9 and 11–13. An inlet distributor, such as circular plate member 31 in FIGS. 1 and 11 with the multiplicity of tubes 32, extended across a full cross-sectional area of the reactor underneath the truncated conical bed support to form a plenum or inlet chamber between the inlet distributor and the truncated conical bed support, as generally illustrated in FIGS. 8, 9 and 11–13. The truncated conical bed support for the catalyst bed included a series of annular polygons that included a plurality of segmented plates (such as segmented plates 27 in FIGS. 2 and 3) connected to or formed with radial spoke members such as members 26 FIGS. 10–13. The plurality of segmented plates, each having a thickness of about 10 inches and a width of about 1.5 inch, were secured to 8 radial spoke members. The interengaged segmented plates and radial spoke members formed a web-like structure to produce essentially annularly continuous mixture zones for receiving a flow of hydrocarbon feed stream, and were overlayed with a screen having screen openings with a mean diameter that was smaller than the catalytic particulates. Each mixture zone underneath the screen had a generally circumferentially uniform thickness.

The catalytic particulates comprised an alumina porous carrier material or alumina inorganic support. Deposited on and/or in the alumina porous carrier material was an oxidic hydrotreating catalyst component consisting of NiO and/or $MoO_3$. The Mo was present on and/or in the alumina porous carrier material in an amount of about 3% by wt., based on the combined weight of the alumina porous carrier material and the oxidic hydrotreating catalyst component(s). The Ni was present on and/or in the alumina porous carrier material in an amount of about 1% by wt., based on the combined weight of the alumina porous carrier material and the oxidic hydrotreating catalyst component(s). The surface area of the catalytic particulates was about 120 sq. meters per gram.

The plurality of catalytic particulates were generally spherical with a mean diameter having a value ranging from about 6 Tyler mesh to about 8 Tyler mesh and an aspect ratio of about 1. The mean crush strength of the catalytic particulates was about 5 lbs. force. The metals loading capacity of the catalyst or plurality of catalytic particulates was about 0.3 grams of metal per cubic centimeter of catalytic particulate bulk volume.

The catalytic particulates had a size distribution such that 98.5% by weight of the catalytic particulates in the catalyst bed had a diameter ranging from $R_1$ to $R_2$ wherein: (i) $R_1$ had a value of about 0.093 inch (i.e. the approximate opening of an 8 mesh Tyler screen); (ii) $R_2$ had a value of about 0.131 inch (i.e. the approximate opening size of a 6 mesh Tyler screen); and (iii) the ratio $R_2/R_1$ had a value equal to about the square root of 2.0 or about 1.414. The size distribution of the catalytic particulates was also such that a maximum of about 1.0% by weight of the catalytic particulates had a diameter less than $R_1$. The catalyst further also had a size distribution such that a maximum of about 0.2% by weight of the catalytic particulates had a diameter less than $R_3$, wherein $R_3$ was less than $R_1$ and the value of the ratio $R_1/R_3$ was about the square root of 2.0 or about 1.414.

The catalytic particulates of the catalyst had a maximum attrition of about 0.5% by weight of the catalytic particulates through a diameter (i.e. a Tyler screen opening) having the value of $R_1$, and a further maximum attrition of about 0.2% by weight of the catalytic particulates through a diameter (i.e. a Tyler screen opening) having the value of $R_3$ wherein $R_3$ again was less than $R_1$ and the value of the ratio of $R_1/R_3$ was about the square root of 2.0 or about 1.414. Stated alternatively, for the catalytic particulates with the specified size range or distribution of about 6 to about 8 Tyler mesh, the specified attrition for the catalytic particulates was up to about 0.5% by weight MAX through 8 Tyler mesh and up to about 0.2% by weight MAX through 10 Tyler mesh.

The catalytic particulates had a maximum fines content of up to about 1.0% by wt. through 8 Tyler mesh and up to about 0.2% by wt. through 10 Tyler mesh. Stated alternatively, for the catalytic particulates with the specified size range or distribution of about 6 to about 8 Tyler mesh, the specified fines content for the catalytic particulates was up to about 1.0% wt. fines MAX through 8 Tyler mesh and up to about 0.2% by wt. fines MAX through 10 Tyler mesh. The catalytic particulates had a uniform density such that mean density of the catalytic particulates were about 0.9 g/cc.

The liquid component of the hydrocarbon feed stream was a heavy atmospheric residuum wherein at least 95% by volume of which boiled above about 343° C. and wherein a substantial fraction (e.g. 50% by volume) boiled above about 510° C. The "heavy" hydrocarbon feed had an undesirable metal content of about 90 ppm by weight of the "heavy" hydrocarbon feed. The hydrogen-containing gas of the hydrocarbon feed stream was essentially 97% pure hydrogen and was mixed with the heavy atmospheric residuum stream in a mixing ratio of 623 liters of hydrogen-containing gas at standard conditions per liter of heavy atmospheric residuum in order to form the hydrocarbon feed stream.

The hydrocarbon feed stream was passed through the inlet distributor and introduced into the plenum chamber of reactor at a flow rate ranging from about 0.1 ft/sec. to about 1.00 ft/sec. The hydroprocessing pressure and temperature within the reactor were about 2300 psig. and about 400° C. respectively. From the plenum chamber of the reactor the hydrocarbon feed stream entered into the annular continuous mixture zones and was uniformly fed through the screen and into the catalyst bed such as not to induce local ebullation or eddy currents in the catalyst bed, especially in proximity to the conical bed support which was overlayed with the screen.

The catalyst bed in the reactor contained a plurality of axially spaced apart hydrogen gas redistribution (or hydrogen gas-quenching) assemblies (see FIGS. 5 and 7 as illustrative of the hydrogen gas-quenching assemblies). As the hydrocarbon feed stream flowed upwardly through the catalyst bed, hydrogen gas was emitted from the hydrogen gas redistribution assemblies, which redistributed any hydrogen-containing gas that had become channeled in a portion of the catalyst bed below (or in close proximity to) the hydrogen gas redistribution assemblies and further avoided generation of local hot spots, eddy currents or ebullation in the upper part (especially above the hydrogen gas redistribution assemblies) of the catalyst bed.

The liquid hydrocarbon feed stream exited the reactor at a withdrawal flow rate of about 3.6 ft/sec. and had been upgraded such that it contained a metal content of about 3 ppm by wt. of the liquid hydrocarbon feed stream. As the hydrocarbon feed stream flowed upwardly through the catalyst bed, a gamma ray source in the catalyst bed in combination with a gamma ray detector on the reactor (see for example gamma ray source 22 in the catalyst bed 10 competing with the gamma ray detector 24 on the reactor vessel 10 in FIG. 1) detected that the catalyst bed expanded less than 10% by length over or beyond substantially the full axial length of the catalyst bed in a packed bed state.

After the reactor was on stream for about 1 weeks, approximately 7.25 cubic meters (or about 3.3% by weight of the catalyst bed) of catalytic particulates were laminarly withdrawn in the hydrocarbon feed stream through a J-tube (such as J-tube 29 in FIG. 1) at a flow rate of about 3.6 ft/sec. The withdrawn catalyst in the hydrocarbon feed stream had a concentration of about 0.5 lbs. catalyst/lb. catalyst slurry (i.e. weight of withdrawn catalyst plus weight of hydrocarbon feed stream). When and/or as the volume of catalytic particulates were withdrawn or transferred from the bottom of the catalyst bed, the catalyst bed (i.e. a substantially packed bed of catalyst) began to plug-flow. The withdrawn catalyst was replaced by introducing a comparable volume of fresh replacement catalyst through the top of the reactor. The fresh replacement catalyst was slurried in a hydrocarbon refined stream (e.g. gas oil) and was introduced into the reactor at a flow catalyst replacement rate of about 3.6 ft/sec., and at a catalyst replacement concentration of about 0.5 lbs. replacement catalyst/lb. catalyst slurry (i.e. weight of replacement catalyst plus the hydrocarbon refined stream (e.g. gas oil) as the slurrying medium).

While the present invention has been described herein with reference to particular embodiments thereof, a latitude of modification, various changes and substitutions are intended in the foregoing disclosure, and it will be appreciated that in some instances some features of the invention will be employed without a corresponding use of other features without departing from the scope of the invention as set forth.

We claim:

1. A method for hydroprocessing a hydrocarbon feed stream that is upflowing through a hydroconversion reaction zone having catalysts of different densities comprising the steps of:

(a) disposing a plurality of first catalyst particles in a hydroconversion reaction zone, with each of said first catalyst particles having a first catalyst base and a first catalyst density;

(b) upflowing into said plurality of first catalyst particles a hydrocarbon feed stream having a liquid component and a hydrogen-containing gas component;

(c) disposing a plurality of second catalyst particles in the hydroconversion reaction zone, with each of said second catalyst particles comprising a second catalyst base and a second catalyst density to produce a catalytic mixture which includes the first catalyst particles of step (a) and the second catalyst particles;

(d) continuing upflowing into said catalytic mixture of step (c) the hydrocarbon feed stream;

(e) withdrawing a volume of at least partially spent catalyst from said hydroconversion reaction zone; and (f) adding fresh catalyst into said hydroconversion reaction zone at a volume to substantially replace said volume of said at least partially spent catalyst.

2. The method of claim 1 wherein said first catalyst density differs from said second catalyst density.

3. The method of claim 1 wherein said first catalyst base differs from said second catalyst base.

4. The method of claim 2 wherein said first catalyst base differs from said second catalyst base.

5. The method of claim 1 wherein said first plurality of first catalyst particles have a first physical and/or catalytic properties, and said second plurality of second catalyst particles have a second physical and/or catalytic properties.

6. The method of claim 4 wherein said first plurality of first catalyst particles have a first physical and/or catalytic properties, and said second plurality of second catalyst particles have a second physical and/or catalytic properties.

7. The method of claim 5 wherein said first physical and/or catalytic properties differ from said second physical and/or catalytic properties.

8. The method of claim 6 wherein said first physical and/or catalytic properties differ from said second physical and/or catalytic properties.

9. The method of claim 1 wherein said step (f) adding fresh catalyst comprises adding a plurality of first fresh catalyst particles.

10. The method of claim 1 wherein said step (f) adding fresh catalyst comprises adding a plurality of second fresh catalyst particles.

11. The method of claim 1 wherein said step (f) adding fresh catalyst comprises adding a mixture of a plurality of first fresh catalyst particles and a plurality of second fresh catalyst particles.

12. The method of claim 9 wherein said first fresh catalyst particles comprises said first catalyst particles.

13. The method of claim 10 wherein said second fresh catalyst particles comprises said second catalyst particles.

14. The method of claim 11 wherein said first fresh catalyst particles comprises said first catalyst particles and said second fresh catalyst particles comprises said second catalyst particles.

15. The method of claim 2 wherein said first catalyst particles have a mean diameter ranging from about 35 Tyler mesh to about 3 Tyler mesh; and a size distribution such that at least about 90% by weight of said first catalyst particles have an aspect ratio less than about 2.0 and a diameter ranging from $R_1$ to $R_2$ wherein:

(a) $R_1$ has a value ranging from about 1/64 inch to about 1/4 inch;

(b) $R_2$ has a value ranging from about 1/64 inch to about 1/4 inch;

(c) a value of a ratio $R_2/R_1$, ranges from a 1.0 to about 1.4, and further wherein; said first catalyst particles have a size distribution such that a maximum of about 2.0% by weight of said first catalyst particles have a diameter less than $R_1$ and a maximum of about 0.4% by weight of said first catalyst particles have a diameter less than $R_3$, wherein $R_3$ is less than $R_1$ and the value of the ratio $R_1/R_2$ is about 1.4.

16. A method for hydroprocessing a hydrocarbon feed stream that is upflowing through a hydroconversion reaction zone having catalysts of different densities comprising the steps of:

(a) disposing a catalyst mixture into a hydroconversion reaction zone wherein said catalyst mixture comprises a plurality of first catalyst particles and a plurality of second catalyst particles, with each of said first catalyst particles comprising a first catalyst base and a first catalyst density and with each of said second catalyst particles comprising a second catalyst base and a second catalyst density;

(b) upflowing into said catalyst mixture of step (a) a hydrocarbon feed stream having a liquid component and a hydrogen-containing gas component;

(c) withdrawing a volume of at least partially spent catalyst from said hydroconversion reaction zone; and (d) adding fresh catalyst into said hydroconversion reaction zone at a volume to substantially replace said withdrawn volume of said at least partially spent catalyst.

17. The method of claim 16 wherein said first catalyst density differs from said second catalyst density.

18. The method of claim 16 wherein said first catalyst base differs from said second catalyst base.

19. The method of claim 17 wherein said first catalyst base differs from said second catalyst base.

20. The method of claim 16 wherein said first plurality of first catalyst particles have a first physical and/or catalytic properties, and said second plurality of second catalyst particles have a second physical and/or catalytic properties.

21. The method of claim 19 wherein said first plurality of first catalyst particles have a first physical and/or catalytic properties, and said second plurality of second catalyst particles have a second physical and/or catalytic properties.

22. The method of claim 20 wherein said first physical and/or catalytic properties differ from said second physical and/or catalytic properties.

23. The method of claim 21 wherein said first physical and/or catalytic properties differ from said second physical and/or catalytic properties.

24. The method of claim 16 wherein said step (d) adding fresh catalyst comprises adding a plurality of first fresh catalyst particles.

25. The method of claim 16 wherein said step (d) adding fresh catalyst comprises adding a plurality of second fresh catalyst particles.

26. The method of claim 16 wherein said step (d) adding fresh catalyst comprises adding a mixture of a plurality of first fresh catalyst particles and a plurality of second fresh catalyst particles.

27. The method of claim 24 wherein said first fresh catalyst particles comprises said first catalyst particles.

28. The method of claim 25 wherein said second fresh catalyst particles comprises said second catalyst particles.

29. The method of claim 26 wherein said first fresh catalyst particles comprises said first catalyst particles and said second fresh catalyst particles comprises said second catalyst particles.

30. The method of claim 17 wherein said first catalyst particles have a mean diameter ranging from about 35 Tyler mesh to about 3 Tyler mesh; and a size distribution such that at least about 90% by weight of said first catalyst particles have an aspect ratio less than about 2.0 and a diameter ranging from $R_1$ to $R_2$ wherein:

(a) $R_1$ has a value ranging from about 1/64 inch to about 1/4 inch;

(b) $R_2$ has a value ranging from about 1/64 inch to about 1/4 inch;

(c) a value of a ratio $R_2/R_1$, ranges from a 1.0 to about 1.4, and further wherein; said first catalyst particles have a size distribution such that a maximum of about 2.0% by weight of said first catalyst particles have a diameter less than $R_1$ and a maximum of about 0.4% by weight of said first catalyst particles have a diameter less than $R_3$, wherein $R_3$ is less than $R_1$ and the value of the ratio $R_1/R_3$ is about 1.4.

* * * * *